US012130806B2

(12) United States Patent
Amadieu et al.

(10) Patent No.: US 12,130,806 B2
(45) Date of Patent: Oct. 29, 2024

(54) DEVICE, SYSTEM AND METHOD FOR REDUCING BANDWIDTH USAGE BY PERFORMING PROVIDER OBJECT ADJUSTMENTS AT AN INTERMEDIATION SERVER BASED ON HISTORICAL DATA

(71) Applicant: AMADEUS S.A.S., Biot (FR)

(72) Inventors: Olivier Amadieu, Roquefort les Pins (FR); Yannick Devaux, Mougin (FR); Jean-Marie Cazorla, Opio (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/072,806

(22) Filed: Dec. 1, 2022

(65) Prior Publication Data

US 2024/0184776 A1 Jun. 6, 2024

(51) Int. Cl.
*G06F 7/00* (2006.01)
*G06F 16/21* (2019.01)
*G06F 16/23* (2019.01)

(52) U.S. Cl.
CPC ........ *G06F 16/2393* (2019.01); *G06F 16/219* (2019.01); *G06F 16/235* (2019.01)

(58) Field of Classification Search
CPC ... G06F 16/2393; G06F 16/219; G06F 16/235
See application file for complete search history.

(56) References Cited

U.S. PATENT DOCUMENTS

| | | | |
|---|---|---|---|
| 11,140,237 B2 | 10/2021 | Landra et al. | |
| 11,586,978 B2 | 2/2023 | Amadieu et al. | |
| 2003/0093187 A1* | 5/2003 | Walker | B64D 45/0059 701/1 |

(Continued)

FOREIGN PATENT DOCUMENTS

EP 3842959 A1 1/2024

OTHER PUBLICATIONS

Street, Tarran, "Science of Travel with Bill Nye", May 17, 2017, expedia.com, originally available at URL: https://www.expedia.com/stories/science-travel-bill-nye/, Retrieved from the Wayback Machine on Aug. 20, 2024 from URL: https://web.archive.org/web/20221006225931/https://www.expedia.com/stories/science-travel-bill-nye/.

*Primary Examiner* — Mohammed R Uddin
(74) *Attorney, Agent, or Firm* — PERRY + CURRIER, INC.

(57) ABSTRACT

A device, system and method for reducing bandwidth usage by performing provider object adjustments at an intermediation server based on historical data is provided. A computing device (e.g. an intermediation server): maintains historical provider object data representing differences between provider objects generated by a provider system/systems according to first and second standard types; receives, from a client device, a request for a provider object representing at least one item provided by a provider system; retrieves, from one or more memories, the provider object generated according to the first standard type; adjusts, the provider object, generated according to the first standard type, based on the historical provider object data, such that the adjusted provider object, includes estimates of information provided by the provider system when the provider system generates the provider objects according to the second standard type; and provides, to the client device, the adjusted provider object.

18 Claims, 11 Drawing Sheets

(56) References Cited

U.S. PATENT DOCUMENTS

| | | | |
|---|---|---|---|
| 2006/0100914 A1* | 5/2006 | Jafri | G06Q 50/14 |
| | | | 705/5 |
| 2007/0129975 A1* | 6/2007 | Jafri | G06Q 30/06 |
| | | | 705/5 |
| 2008/0189148 A1* | 8/2008 | Diaz | G06Q 10/02 |
| | | | 705/6 |
| 2013/0024404 A1* | 1/2013 | Zacharia | G06Q 10/02 |
| | | | 706/12 |
| 2013/0103434 A1* | 4/2013 | Cazeaux | G06Q 50/14 |
| | | | 705/5 |
| 2014/0278590 A1* | 9/2014 | Abbassi | G06F 16/9024 |
| | | | 705/5 |
| 2017/0206539 A1* | 7/2017 | Gupta | G06Q 30/0202 |
| 2017/0268891 A1* | 9/2017 | Dyrnaes | G01C 21/3492 |
| 2018/0089598 A1* | 3/2018 | Sedlarevic | G06Q 20/102 |
| 2020/0379972 A1* | 12/2020 | Brun | G06F 16/248 |
| 2020/0380425 A1* | 12/2020 | Brun | G06F 16/248 |
| 2021/0117849 A1 | 4/2021 | Amadieu et al. | |
| 2021/0117850 A1 | 4/2021 | Amadieu et al. | |
| 2021/0166294 A1* | 6/2021 | Landra | G06F 16/2358 |
| 2021/0192006 A1* | 6/2021 | Brun | G06F 16/972 |
| 2022/0374787 A1* | 11/2022 | Ghourdjian | G06F 16/172 |
| 2023/0214925 A1* | 7/2023 | Cella | G06Q 30/06 |
| | | | 705/37 |
| 2023/0376499 A1* | 11/2023 | Amadieu | G06F 16/245 |
| 2023/0385930 A1* | 11/2023 | Rasori | G06Q 40/02 |
| 2023/0386710 A1* | 11/2023 | Akamatsu | B22F 1/145 |

* cited by examiner

DEVICE, SYSTEM AND METHOD FOR REDUCING BANDWIDTH USAGE BY PERFORMING PROVIDER OBJECT ADJUSTMENTS AT AN INTERMEDIATION SERVER BASED ON HISTORICAL DATA

FIELD

The specification relates generally to intermediation between devices, and specifically to a device, system and method for reducing bandwidth usage by performing provider object adjustments at an intermediation server based on historical data.

BACKGROUND

The provision of various products, including for example travel-related goods and services (e.g., flights, hotel reservations, and the like) typically requires various discrete entities to exchange data defining various aspects of the products. Examples of such entities, in the context of travel-related products, include airlines, travel agencies, end users, reservation systems, and the like. Although such entities may be configured to exchange data according to a standardized format (e.g., according to the extensible Markup Language (XML)-based New Distribution Capability (NDC) standard in the context of travel-related products), they may nonetheless employ different mechanisms to initiate the exchange of data. However, certain mechanisms may result in increased bandwidth usage and/or increased use of processing resources between components of a system that exchange data with regards to provisioning of various products.

SUMMARY

A first aspect of the present specification provides a method comprising: maintaining, via one or more computing devices, historical provider object data representing differences between provider objects generated by one or more provider systems according to a first standard type and a second standard type, the provider objects representing respective items provided by the one or more provider systems; receiving, at the one or more computing devices, from a client device, a request for a provider object, the provider object representing at least one item provided by a provider system; retrieving, via the one or more computing devices, from one or more memories, the provider object generated according to the first standard type; adjusting, via the one or more computing devices, the provider object, generated according to the first standard type, based on the historical provider object data, such that the provider object, as adjusted, includes estimates of information provided by the provider system when the provider system generates the provider objects according to the second standard type; and providing, from the one or more computing devices, to the client device, the provider object as adjusted.

At the method of the first aspect, adjusting the provider object, generated according to the first standard type, may comprise one or more of: adjusting a price of the provider object; and adjusting content of the provider object.

At the method of the first aspect, adjusting the provider object, generated according to the first standard type, may occur according to a programmatic adjustment process or a machine learning adjustment process, and the method may further comprise: maintaining records of respective differences between previous provider objects, as adjusted by the programmatic adjustment process and the machine learning adjustment process, to respective previous provider objects of the second standard type as generated by the provider system; and selecting the programmatic adjustment process or the machine learning adjustment process to adjust the provider object based on which of the programmatic adjustment process or the machine learning adjustment process resulted in smallest of the respective differences relative to the respective previous provider objects of the second standard type as generated by the provider system.

At the method of the first aspect, adjusting the provider object, generated according to the first standard type, may occur according to a programmatic adjustment process or a machine learning adjustment process, and the method may further comprise: retrieving, from the provider system, a respective provider object, generated by the provider system according to the second standard type, that corresponds to the provider object retrieved from the one or more memories; and updating one or more of the programmatic adjustment process and the machine learning adjustment process based on respective differences between the provider object, generated according to the first standard type and retrieved from the one or more memories, and the respective provider object, generated according to the second standard type.

At the method of the first aspect, retrieving the provider object, generated according to the first standard type, may occur according to a first retrieval process or a second retrieval process, and the method may further comprise: maintaining records of respective differences between previous provider objects, generated according to the first standard type, retrieved by the first retrieval process and the second retrieval process, and respective previous provider objects of the second standard type as generated by the provider system; and selecting the first retrieval process or the second retrieval process to retrieve the provider object, generated according to the first standard type, based on which of the first retrieval process and the second retrieval process resulted in smallest of the respective differences relative to the respective previous provider objects of the second standard type as generated by the provider system.

At the method of the first aspect, adjusting the provider object, generated according to the first standard type, may comprise: adjusting the provider object to generate a plurality of provider objects, the plurality of provider objects, as adjusted, including respective estimates of information provided by the provider system when the provider system generates the plurality of provider objects according to the second standard type, the plurality of provider objects as adjusted including the provider object as adjusted, and wherein the providing, to the client device, the provider object as adjusted, may comprise providing, to the client device, the plurality of provider objects as adjusted.

The method of the first aspect may further comprise: generating a plurality of additional provider objects, according to the second standard type, from the provider object as adjusted, the plurality of additional provider objects including further estimates of further information provided by the provider system when the provider system generates the provider objects according to the second standard type, all of the plurality of additional provider objects and the provider object as adjusted comprising common information; and providing, to the client device, the plurality of additional provider objects.

The method of the first aspect may further comprise: maintaining, via the one or more computing devices, additional historical provider object data representing respective differences between single provider objects generated by the provider system according to a given standard type, and one or more corresponding provider objects, also generated by the provider system, that represent at least one same item as a respective single provider object, the one or more corresponding provider objects further representing other items; receiving, at the one or more computing devices, from the client device, a further request for a further provider object, the further provider object representing at least one item provided by the provider system; retrieving, via the one or more computing devices, from the one or more memories, the further provider object of the given standard type that meets further criteria of the further request, the further provider object representing a given item; adjusting, via the one or more computing devices, the further provider object, retrieved from the one or more memories, based on the additional historical provider object data, to generate one or more additional provider objects that include respective estimates of further information provided by the provider system when the provider system generates one or more corresponding additional provider objects according to the given standard type using the further criteria of the further request, the additional provider objects representing the given item of the further provider object, and one or more other items different from items of the further provider object; and providing, from the one or more computing devices, to the client device, the further provider object and the one or more additional provider objects.

At the method of the first aspect, the first standard type may comprise a Global Distribution System (GDS)-based data exchange system, and the second standard type may comprise New Distribution Capability (NDC)-based data exchange system.

A second aspect of the present specification provides a device comprising: a communication interface; and a controller configured to: maintain historical provider object data representing differences between provider objects generated by one or more provider systems according to a first standard type and a second standard type, the provider objects representing respective items provided by the one or more provider systems; receive, via the communication interface, from a client device, a request for a provider object, the provider object representing at least one item provided by a provider system; retrieve, from one or more memories, the provider object generated according to the first standard type; adjust the provider object, generated according to the first standard type, based on the historical provider object data, such that the provider object, as adjusted, includes estimates of information provided by the provider system when the provider system generates the provider objects according to the second standard type; and provide, via the communication interface, to the client device, the provider object as adjusted.

At the device of the second aspect, the controller may be further configured to adjust the provider object, generated according to the first standard type, by one or more of: adjusting a price of the provider object; and adjusting content of the provider object.

At the device of the second aspect, the controller may be further configured to adjust the provider object, generated according to the first standard type, according to a programmatic adjustment process or a machine learning adjustment process, and the controller may be further configured to: maintain records of respective differences between previous provider objects, as adjusted by the programmatic adjustment process and the machine learning adjustment process, to respective previous provider objects of the second standard type as generated by the provider system; and select the programmatic adjustment process or the machine learning adjustment process to adjust the provider object based on which of the programmatic adjustment process or the machine learning adjustment process resulted in smallest of the respective differences relative to the respective previous provider objects of the second standard type as generated by the provider system.

At the device of the second aspect, the controller may be further configured to adjust the provider object, generated according to the first standard type, according to a programmatic adjustment process or a machine learning adjustment process, and the controller may be further configured to: retrieve, from the provider system, a respective provider object, generated by the provider system according to the second standard type, that corresponds to the provider object retrieved from the one or more memories; and update one or more of the programmatic adjustment process and the machine learning adjustment process based on respective differences between the provider object, generated according to the first standard type and retrieved from the one or more memories, and the respective provider object, generated according to the second standard type.

At the device of the second aspect, the controller may be further configured to retrieve the provider object, generated according to the first standard type, according to a first retrieval process or a second retrieval process, and the controller may be further configured to: maintain records of respective differences between previous provider objects, generated according to the first standard type, retrieved by the first retrieval process and the second retrieval process, and respective previous provider objects of the second standard type as generated by the provider system; and select the first retrieval process or the second retrieval process to retrieve the provider object, generated according to the first standard type, based on which of the first retrieval process and the second retrieval process resulted in smallest of the respective differences relative to the respective previous provider objects of the second standard type as generated by the provider system.

At the device of the second aspect, the controller may be further configured to: generate a plurality of additional provider objects, according to the second standard type, from the provider object as adjusted, the plurality of additional provider objects including further estimates of further information provided by the provider system when the provider system generates the provider objects according to the second standard type, all of the plurality of additional provider objects and the provider object as adjusted comprising common information; and provide, to the client device, the plurality of additional provider objects.

At the device of the second aspect, the controller may be further configured to: maintain additional historical provider object data representing respective differences between single provider objects generated by the provider system according to a given standard type, and one or more corresponding provider objects, also generated by the provider system, that represent at least one same item as a respective single provider object, the one or more corresponding provider objects further representing other items; receive, from the client device, a further request for a further provider object, the further provider object representing at least one item provided by the provider system; retrieve, from the one or more memories, the further provider object of the given standard type that meets further criteria of the further request, the further provider object representing a given item; adjust the further provider object, retrieved from the one or more memories, based on the additional historical provider object data, to generate one or more additional provider objects that include respective estimates of further information provided by the provider system when the provider system generates one or more corresponding additional provider objects according to the given standard type using the further criteria of the further request, the additional provider objects representing the given item of the further provider object, and one or more other items different from items of the further provider object; and provide, to the client device, the further provider object and the one or more additional provider objects.

At the device of the second aspect, the first standard type may comprise a Global Distribution System (GDS)-based data exchange system, and the second standard type may comprise New Distribution Capability (NDC)-based data exchange system.

A third aspect of the specification provides a non-transitory computer-readable medium storing a computer program, wherein execution of the computer program is to implement a method comprising: maintaining, via one or more computing devices, historical provider object data representing differences between provider objects generated by one or more provider systems according to a first standard type and a second standard type, the provider objects representing respective items provided by the one or more provider systems; receiving, at the one or more computing devices, from a client device, a request for a provider object, the provider object representing at least one item provided by a provider system; retrieving, via the one or more computing devices, from one or more memories, the provider object generated according to the first standard type; adjusting, via the one or more computing devices, the provider object, generated according to the first standard type, based on the historical provider object data, such that the provider object, as adjusted, includes estimates of information provided by the provider system when the provider system generates the provider objects according to the second standard type; and providing, from the one or more computing devices, to the client device, the provider object as adjusted.

At the method of the third aspect, adjusting the provider object, generated according to the first standard type, may comprise one or more of: adjusting a price of the provider object; and adjusting content of the provider object.

At the method of the third aspect, adjusting the provider object, generated according to the first standard type, may occur according to a programmatic adjustment process or a machine learning adjustment process, and the method may further comprise: maintaining records of respective differences between previous provider objects, as adjusted by the programmatic adjustment process and the machine learning adjustment process, to respective previous provider objects of the second standard type as generated by the provider system; and selecting the programmatic adjustment process or the machine learning adjustment process to adjust the provider object based on which of the programmatic adjustment process or the machine learning adjustment process resulted in smallest of the respective differences relative to the respective previous provider objects of the second standard type as generated by the provider system.

At the method of the third aspect, adjusting the provider object, generated according to the first standard type, may occur according to a programmatic adjustment process or a machine learning adjustment process, and the method may further comprise: retrieving, from the provider system, a respective provider object, generated by the provider system according to the second standard type, that corresponds to the provider object retrieved from the one or more memories; and updating one or more of the programmatic adjustment process and the machine learning adjustment process based on respective differences between the provider object, generated according to the first standard type and retrieved from the one or more memories, and the respective provider object, generated according to the second standard type.

At the method of the third aspect, retrieving the provider object, generated according to the first standard type, may occur according to a first retrieval process or a second retrieval process, and the method may further comprise: maintaining records of respective differences between previous provider objects, generated according to the first standard type, retrieved by the first retrieval process and the second retrieval process, and respective previous provider objects of the second standard type as generated by the provider system; and selecting the first retrieval process or the second retrieval process to retrieve the provider object, generated according to the first standard type, based on which of the first retrieval process and the second retrieval process resulted in smallest of the respective differences relative to the respective previous provider objects of the second standard type as generated by the provider system.

At the method of the third aspect, adjusting the provider object, generated according to the first standard type, may comprise: adjusting the provider object to generate a plurality of provider objects, the plurality of provider objects, as adjusted, including respective estimates of information provided by the provider system when the provider system generates the plurality of provider objects according to the second standard type, the plurality of provider objects as adjusted including the provider object as adjusted, and wherein the providing, to the client device, the provider object as adjusted, may comprise providing, to the client device, the plurality of provider objects as adjusted.

The method of the third aspect may further comprise: generating a plurality of additional provider objects, according to the second standard type, from the provider object as adjusted, the plurality of additional provider objects including further estimates of further information provided by the provider system when the provider system generates the provider objects according to the second standard type, all of the plurality of additional provider objects and the provider object as adjusted comprising common information; and providing, to the client device, the plurality of additional provider objects.

The method of the third aspect may further comprise: maintaining, via the one or more computing devices, additional historical provider object data representing respective differences between single provider objects generated by the provider system according to a given standard type, and one or more corresponding provider objects, also generated by the provider system, that represent at least one same item as a respective single provider object, the one or more corresponding provider objects further representing other items; receiving, at the one or more computing devices, from the client device, a further request for a further provider object, the further provider object representing at least one item provided by the provider system; retrieving, via the one or more computing devices, from the one or more memories, the further provider object of the given standard type that meets further criteria of the further request, the further provider object representing a given item; adjusting, via the one or more computing devices, the further provider object, retrieved from the one or more memories, based on the additional historical provider object data, to generate one or more additional provider objects that include respective estimates of further information provided by the provider system when the provider system generates one or more corresponding additional provider objects according to the given standard type using the further criteria of the further request, the additional provider objects representing the given item of the further provider object, and one or more other items different from items of the further provider object; and providing, from the one or more computing devices, to the client device, the further provider object and the one or more additional provider objects.

At the method of the third aspect, the first standard type may comprise a Global Distribution System (GDS)-based data exchange system, and the second standard type may comprise New Distribution Capability (NDC)-based data exchange system.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Figure 1:
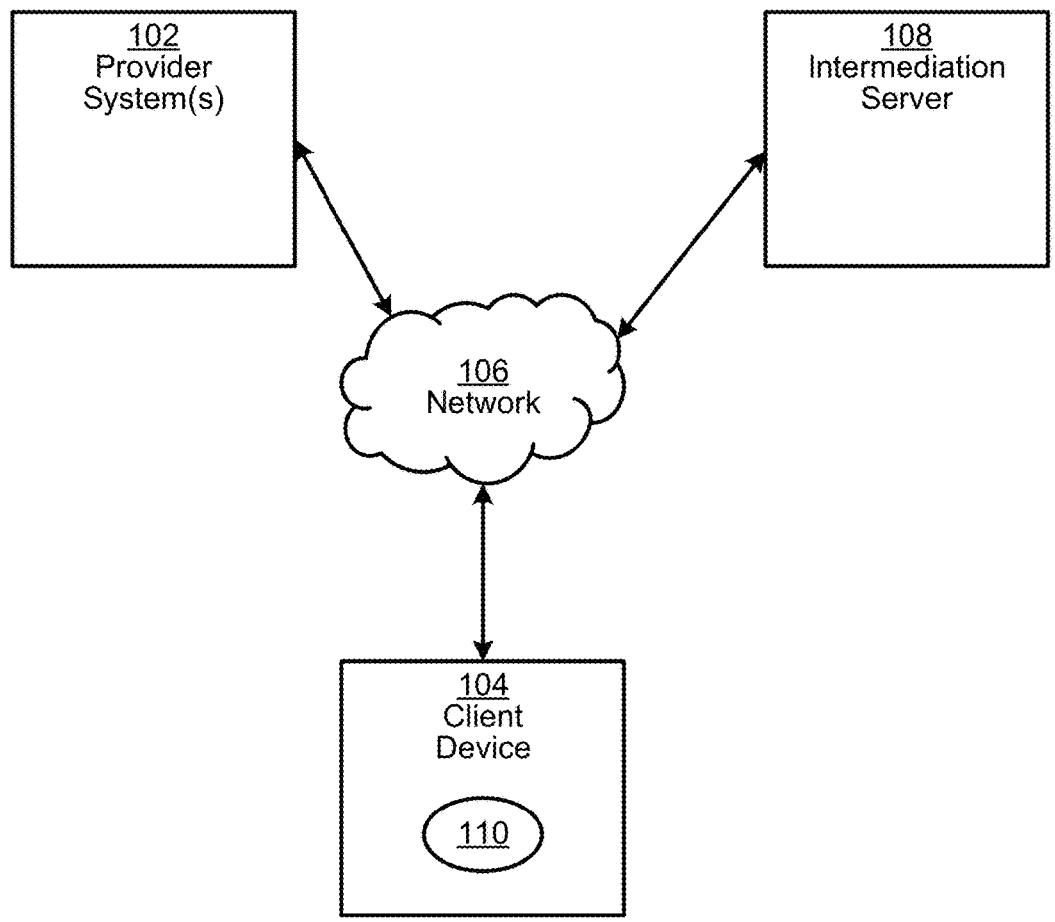
FIG. 1 depicts a system for reducing bandwidth usage by performing provider object adjustments at an intermediation server based on historical data, according to non-limiting examples.

FIG. 1 depicts a system 100 for intermediation between a provider system (e.g., one or more servers or other suitable computing devices), and a client device. Provider objects, in the examples discussed herein, may comprise provider objects and/or data records which correspond to products and/or items, such as travel-related goods and services (e.g., flights, hotel reservations, car rentals and the like), provided by a provider system. More specifically, the products and/or items discussed in the examples below may be flight tickets and related services (e.g., limo pickup services, excursions at a destination, baggage check services, in-flight food, entertainment, pet-related services, and the like). However, as will be apparent to those skilled in the art, the systems and methods discussed below can also be applied to various other types of data objects and/or items including, but not limited to, data objects correspond to any suitable products and/or any suitable items available (e.g., for purchase, and the like) from any suitable website, and the like.

Delivery of the items mentioned above is typically controlled by a provider entity, such as an airline in the case of the items discussed in connection with the travel-industry related examples provided herein. The system 100 includes one or more provider systems 102 (e.g., one or more servers or other suitable computing devices), which in this example is operated by one or more provider entities. The system 100 can include a plurality of client devices 104, although only one client device 104 is shown in FIG. 1 for illustrative purposes.

The system 100 can include a plurality of provider systems 102, each operated by respective provider entities (e.g., various airlines), although only one provider system 102 is shown for illustrative purposes. The provider objects may be in any suitable format including, but not limited to Edifact recommendations in the context of Global Distribution System (GDS)-based data exchange, offer records in the context of New Distribution Capability (NDC)-based data exchange, and/or any other suitable format. Indeed, the provider objects may comprise data objects and/or data records, for example storing an Edifact recommendation or an NDC offer, and/or any other suitable data representing at least one item provided by the provider system 102.

A provider object is understood to define an item, or a combination of items, which may be offered for purchase (e.g., by end users of the items) including, but not limited to one or more of flights, train rides, hotel stays, airport lounge access, seat upgrades, baggage check services, in-flight food, entertainment, pickup services, excursion services, pet-related services, and the like, and/or associated services. Thus, in examples discussed below, a provider object may define a flight operated by the provider entity, and/or services associated with the flight, or proposed as standalone services. Each provider object therefore may contain various fields (e.g., data fields), and the like. Certain fields define item attributes, such as product object identifiers (e.g., service identifiers, item identifiers, product identifiers and the like), locations, dates and times corresponding to the products (e.g., flight times and other itinerary data). The type of fields and/or data of a provider object may depend on a type of a provider object. For example, provider objects corresponding to flights may include flight identifiers, whereas provider objects corresponding to other travel-related items, such as an offer for accessing an airport lounge and/or an offer for a premium seat upgrade, may include information related to the lounge, the premium seat, etc.

Requests for provider objects may be received at the provider system 102 from other components of the system 100. For example, the requests may be received from a client device 104, via a network 106 (e.g., any suitable combination of local and wide area networks, including the Internet) and via an intermediation server 108. As will be described below, the intermediation server 108 generally intermediates between the client device 104 and the provider system 102, for example such that the client device 104 may request products from the provider system 102, and/or more than one provider system 102, via the intermediation server 108.

Furthermore, in some examples, the intermediation server 108 may convert data between formats associated with provider systems 102 and the client device 104. For example, a first provider system 102 may communicate and/or provide provider objects, and/or offers for provider objects, according to a first standard type, and a second provider system 102 may communicate and/or provide provider objects, and/or offers for provider objects, according to a second standard type (e.g., which may be the same or different from the first standard type). Neither format may be compatible with a format used by the client device 104 to communicate. As such, the intermediation server 108 may convert data received in different formats from the provider system 102, to a format compatible with the client device 104, and vice versa.

However, as will be described hereafter, in a specific non-limiting example, the intermediation server 108 may be further configured to adjust provider objects provided by a first provider system 102, generated according to a first standard type, including, but not limited to, a GDS-based data exchange format, to include estimates of information provided by a second provider system 102 (or the first provider system 102) when the second provider system 102 (or the first provider system 102) generates the provider objects according to a second standard type, including, but not limited to, an NDC-based data exchange format, for example prior to providing a provider object to the client device 104.

While GDS and NDC are used as examples of particular standard types, it is understood that any suitable standard types are within the scope of the present specification. Furthermore, the term "format" will be used hereafter to refer to a format of a provider object and/or data exchanges of a given standard type. Hence, a first provider object of a first standard type may be in a first format, and a second provider object of a second standard type may be in a second format.

To distinguish between the intermediation server 108 converting a provider object from a format compatible with a provider system 102 to a format compatible with the client device 104, and the intermediation server 108 adjusting (for example) a GDS-based data exchange format to includes estimates of information provided by the provider system 102 when the provider system 102 generates the provider objects according to (for example) an NDC-based data exchange format, and the like, reference will be made hereafter to the intermediation server 108 adjusting provider objects, generated according to one standard type, to include includes estimates of information provided by the provider system 102 when the provider system 102 generates the provider objects, according to a second standard type. For example, the intermediation server 108 may adjust a provider object generated according to an Edifact (e.g., GDS-based) recommendation (e.g., a first standard type) to include estimates of information provided by the provider system when the provider system generates the provider objects according to an NDC offer (e.g., a second standard type).

However, while adjusting provider objects generated according to a first standard type to includes estimates of information provided by the provider system 102 when the provider system 102 generates the provider objects according to the second standard type is described herein with respect to travel-related provider objects and standard types, such adjusting may occur for any suitable provider objects generated according to any suitable standards.

Furthermore, the adjusting of one provider object by the intermediation server 108, as described herein include generating additional provider objects. Using a travel-related example, the intermediation server 108 may receive a provider object from a provider system 102 in a GDS format, that corresponds to an economy-class plane ticket, and adjust the provider object into an NDC format (e.g., with an NDC-based fare), as well as generate further provider objects for a similar plane ticket, but in one or more higher classes, with relevant fare and/or data fields of the further provider objects adjusted accordingly (e.g., according to NDC-based fares).

The client device 104, in the present example, may be operated by a travel agent entity, and therefore generates and provides requests for provider objects (e.g., representing products which may be for purchase), and/or requests to purchase products (e.g., represented by the provider objects), to the provider system 102, via the intermediation server 108, on behalf of end users (e.g., travelers).

Hence, in one example, the intermediation server 108 may comprises an aggregator server which communicates with a plurality of provider systems 102 and aggregates provider objects and/or offers for provider objects from the plurality of provider systems 102, to provide to the client device 104. When formats of data used by the provider systems 102 and the client device 104 are compatible, the intermediation server 108 may not perform the conversions described herein, with respect to converting from a provider system format to a client device format, when performing the aggregation functionality.

Alternatively, a client device 104 may be operated by a provider system 102. In yet another alternative, a provider system 102 may operate the intermediation server 108. Hence, it is understood that while the provider system 102, the client device 104 and the intermediation server 108 are all depicted as being separate from each other in FIG. 1, they may be associated with various combinations of one or more entities, and/or functionality of the provider system 102, the client device 104 and the intermediation server 108 may be combined in any suitable manner at one or more computing devices and/or servers and/or cloud computing devices. As such, herein, rather than refer to components of the system 100 communicating via transmitting data therebetween (e.g., such as via the network 106), herein communication between components of the system 100 is referred to as the components providing data, and the like, therebetween which may include, but is not limited to, transmitting data over the network 106, communicating data when the components are local to each other and/or combined, and the like.

Various other mechanisms for initiating the creation of the provider objects are also contemplated. For example, end users (via the client device 104 and/or client devices and/or additional computing devices, not shown in FIG. 1) may initiate the creation of the provider objects via direct interaction with a website hosted by the intermediation server 108. Various mechanisms for the creation of provider objects will be apparent to those skilled in the art, such as the "offer" and "order" mechanisms specified by the NDC standard.

The client device 104 is configured to receive data contained in the provider objects via the intermediation server 108. Data obtained by the client device 104, via the intermediation server 108, may be presented to users served by the client device 104, for example via a display screen (not depicted) which may be local to the client device 104; further information associated with the items represented by the provider objects may be requested by the client device 104 which may include, but is not limited to the client device 104 ordering the items. In other words, the system 100 enables the client device 104 to request further information associated with the items represented by the provider objects, via the intermediation server 108. The client device 104 may be configured to request the further information and/or initiate such orders by providing requests to the provider system 102 via the intermediation server 108.

The provider objects provided by the provider system 102 generally include provider object data representing at least one item provided by the provider system 102. In some examples, the provider object data may include a provider object identifier and/or provider object identifier data, that identifies the provider object to the provider system 102. The provider object data generally comprises information that identifies a travel related product and/or service. Whether the provider object data includes a specific provider object identifier, or not may depend on whether a provider object is being in an NDC or GDS format. For example, when a provider object comprises an NDC offer, the provider object identifier data may comprise an identifier generated by the provider system 102 which specifically identifies the NDC offer. However, when a provider object comprises an Edifact recommendation, which generally does not include a specific identifier, the Edifact recommendation may be identified by the provider system 102 and/or the intermediation server 108 based on provider object identifier data such as characteristics of the Edifact recommendation such as a specific order and/or format of data of the Edifact recommendation.

In general, communication between the client device 104 and the intermediation server 108 occurs via a computing-process flow 110 implemented by the client device 104, such as an Applications Programming Interface (API), and the like. For example, during ordering of a provider object (e.g., booking a flight), the client device 104 may implement the computing-process flow 110 in the form of an API, and communications between the client device 104 and the intermediation server 108 may be defined by the API.

Figure 3:
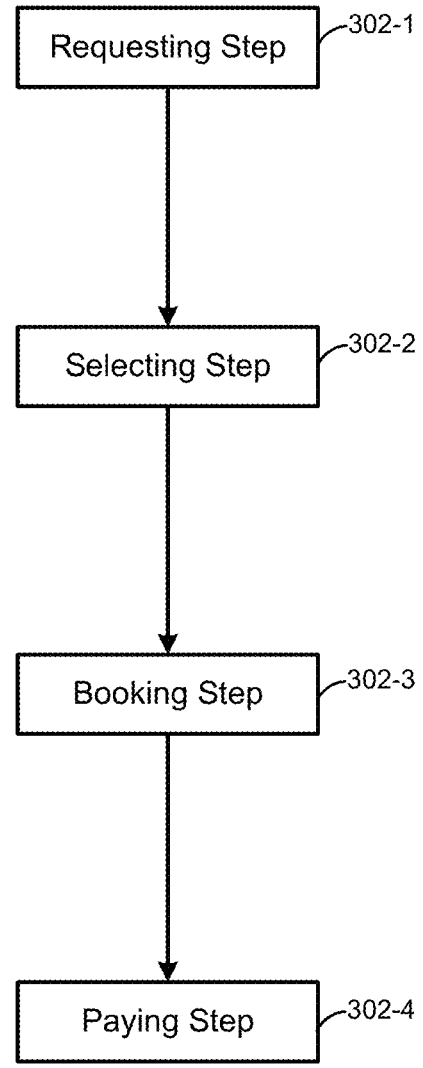
FIG. 3 depicts a computing-process flow of the system of FIG. 1, according to non-limiting examples.

Regardless, the steps of ordering a provider object may occur according to a predefined series of steps, which are discussed in more detail with respect to FIG. 3 but which may include a requesting step, a selecting step, a booking step and a paying step. However, the requesting step, in which the client device 104 may request provider objects from one or more provider systems 102 via the intermediation server 108, may cause undo network traffic at a provider system 102 when the system 100 is configured such the provider system 102 responds to each request for provider objects. In particular, in GDS-based data exchanges, provider systems 102 generally publish (e.g., at a server), and/or make available to the intermediation server 108, information describing various provider objects (e.g., such as flight schedules with corresponding fares) and, at the requesting step, the intermediation server 108 may respond to the client device 104 request for provider objects using such information, without explicitly querying a provider system 102. However, in NDC-based data exchanges, NDC offers (e.g., offers for provider objects) may be based on options that are associated with a provider system 102; such options may specify various factors that may be used a provider system 102 to respond to a request for provider objects, and may include, but are not limited to (e.g., using travel-based examples), destinations and/or airports serviced the provider system 102, connecting airports used by the provider system 102, baggage-related factors used by the provider system 102, and the like, amongst other possibilities.

Hence, it is further understood that, in some examples, the intermediation server 108 and/or one or more of the provider systems 102 operate according to an NDC standard; however a provider system 102 that operates according to the NDC standard may still publish fares, schedules, and the like, according to a GDS standard.

However, while in NDC-based data exchanges, a provider system 102 may receive thousand to millions to hundreds of millions (and sometimes higher) requests per day (e.g., when the requesting step occurs at many different client devices 104), very few may result in a client device 104 booking and/or purchasing, and the like, a provider object. Such a situation may lead to a large waste of bandwidth between the components of the system 100 and/or a large waste of processing resources at the provider system 102.

It is further understood that, to address this issue, the intermediation server 108 is generally configured to maintain historical provider object data representing differences between provider objects generated according to a first standard type, such as historic GDS-based fares, schedules and/or recommendations, and a second standard type, such as historic NDC-based offers that correspond to the historic GDS-based fares, schedules and/or offers. It is understood that the historical provider object data represent provider objects generated by the provider system 102 according to both the first standard type and the second standard type, and is discussed in more detail with respect to FIG. 4.

The intermediation server 108 may generally further have access to currently published GDS-based fares, schedules and/or offers (e.g., as currently published), and may be further configured to adjust such currently published GDS-based fares, schedules and/or recommendations to include estimates of information of corresponding NDC offers, for example when such NDC offers are generated by the provider system 102, based on the historical provider object data.

In particular, such adjustment functionality of the intermediation server 108 generally corresponds to estimated functionality of a provider system 102 used to generate provider objects according to the second standard type (e.g., NDC offers), that the intermediation server 108 may mimic and/or simulate and/or attempt to reproduce. Such adjustment functionality may be in the form of one or more programmatic algorithms and/or one or more machine learning algorithms, and the like.

Hence, when the intermediation server 108 receives a request for a provider object from the client device 104 (e.g., at a requesting step), the intermediation server 108 may retrieve the provider object generated according to the first standard type, for example from currently published GDS-based fares, schedules and/or recommendations, and adjust the provider object, generated according to the first standard type, to includes estimates of information provided by the provider system 102 when the provider system 102 generates provider objects according to the second standard type.

In particular, the intermediation server 108 may perform such an adjustment rather than requesting a provider object from a provider system 102.

Such an adjustment may include, but it not limited to, adjusting a price of the provider object from a first price of the provider object generated according to the first standard type to an estimate of a second price of the provider object, for example had the provider system 102 generated the provider object according to the second standard type. For example, published fares of a flight may not represent an actual fare of a flight and/or the fare may change after being published. The adjustment of the provider object, generated according to the first standard type, to include estimates of information provided by the provider system 102 when the provider system 102 generates provider objects according to the second standard type, may generally represent an attempt by the intermediation server 108 to mimic and/or simulate and/or reproduce an internal process of a provider system 102 to adjust a published GDS-based fare to an NDC-based fare.

Such an adjustment may include, but it not limited to, adjusting content of the provider object from first content of the provider object generated according to the first standard type to an estimate of content of the provider object, for example had the provider system 102 generated the provider object according to the second standard type. For example, published fares of a flight may not include services that may be provided in NDC-based offers, such as included checked bags, lounge passes, and the like. The adjustment of the provider object, generated according to the first standard type, may generally represent an attempt by the intermediation server 108 to mimic and/or simulate and/or reproduce an internal process of a provider system 102 to adjust a published GDS-based flight to an NDC-based offer that includes associated services, and the like.

Hence, when the intermediation server 108 receives the request for a provider object from the client device 104, the intermediation server 108 may retrieve a provider object according to a first standard type, for example a published GDS-based provider object representing a flight, adjust the provider object to include estimates that may be included with a corresponding provider object of a second standard type, for example an NDC-based offer, and provide the provider object, as adjusted, to the client device 104.

Furthermore, as previously described, the intermediation server 108 receives the request for a provider object from the client device 104, the intermediation server 108 may retrieve a provider object according to a first standard type, for example a published GDS-based provider object representing an economy class seat on a flight and a GDS-based fare, adjust the provider object to include estimates that may be included with a corresponding provider object of a second standard type, for example an NDC-based offer with an NDC-based fare, generate further provider objects of the second standard type (e.g., for one or more higher class seats on the flight with corresponding NDC-based fares), and provide the provider objects in the second standard type to the client device 104. While this example is described with respect to the GDS format (and a first standard type) and the NDC format (e.g., a second standard type), and seats on a flight, it is understood the adjusting of a provider object according to a first standard type to include estimates that may be included with a corresponding provider object of a second standard type, may include generating any suitable number of additional provider objects of the second standard type.

Figure 2:
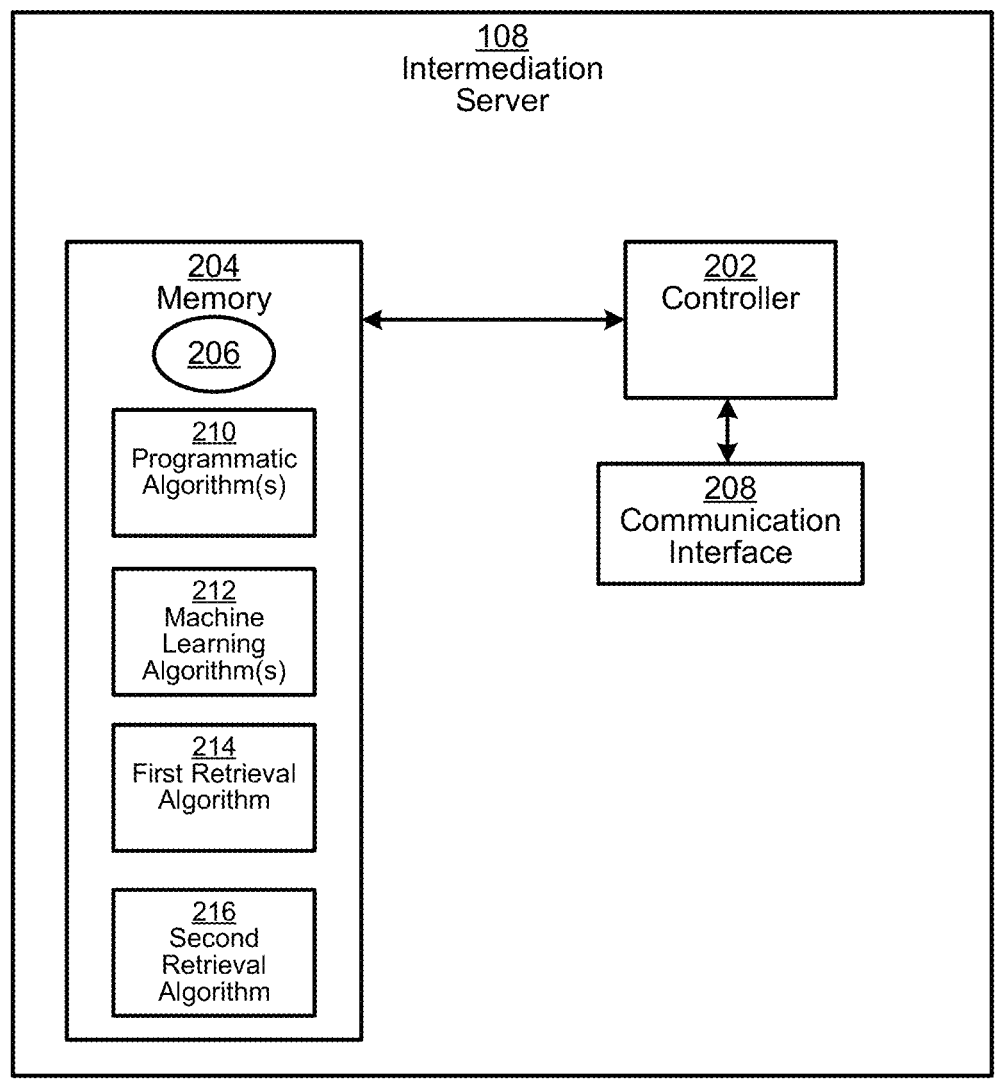
FIG. 2 depicts an intermediation server for reducing bandwidth usage by performing provider object adjustments at an intermediation server based on historical data, according to non-limiting examples.

Turning to FIG. 2, before discussing the functionality of the system 100 in greater detail, certain components of the intermediation server 108 will be discussed in greater detail. While depicted as one device, the intermediation server 108 may comprise one or more computing devices and/or one or more servers and/or one or more cloud computing devices that may be geographically distributed.

As shown in FIG. 2, the intermediation server 108 includes at least one controller 202, such as a central processing unit (CPU) or the like. The controller 202 is interconnected with a memory 204 storing an application 206, the memory 204 implemented as a suitable non-transitory computer-readable medium (e.g., a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 202 and the memory 204 are generally comprised of one or more integrated circuits (ICs).

The controller 202 is also interconnected with a communication interface 208, which enables the intermediation server 108 to communicate with the other computing devices of the system 100 (i.e. the provider systems 102 and the client device 104) via the network 106, though it is understood such communication may occur locally when components of the system 100 are combined. The communication interface 208 therefore may include any necessary components (e.g., network interface controllers (NICs), radio units, and the like) to communicate via the network 106. The specific components of the communication interface 208 may be selected based on upon the nature of the network 106 and/or local communication between components of the system 100, and the like. The intermediation server 108 can also include input and output devices connected to the controller 202, such as keyboards, mice, displays, and the like (not shown).

The components of the intermediation server 108 mentioned above can be deployed in a single enclosure, or in a distributed format. In some examples, therefore, the intermediation server 108 includes a plurality of processors, either sharing the memory 204 and communication interface 208, or each having distinct associated memories and communication interfaces. As such, it is understood that the memory 204, and/or a portion of the memory 204, may be internal (e.g., as depicted) or external to the intermediation server 108; regardless, the controller 202 is understood to have access to the memory 204.

The memory 204 also stores a plurality of computer-readable programming instructions, executable by the controller 202, in the form of various applications, including the application 206. As will be understood by those skilled in the art, the controller 202 executes the instructions of the application 206 (and any other suitable applications) in order to perform various actions defined by the instructions contained therein. In the description below, the controller 202, and more generally the intermediation server 108, are said to be configured to perform those actions. It will be understood that they are so configured via the execution (by the controller 202) of the instructions of the applications stored in memory 204.

In some examples, execution of the application 206, as will be discussed below, configures the intermediation server 108 to implement functionality for reducing bandwidth usage by performing provider object adjustments based on historical data, including but not limited to, the blocks of a method set forth in FIG. 5.

As will be described in more detail below, in some examples, the application 206 may comprise and/or have access to, one or more programmatic algorithms 210, for adjusting a provider object generated according to a first standard type to includes estimates of information provided by the provider system 102 when the provider system 102 generates provider objects according to a second standard type. In other examples, the application 206 may comprise and/or have access to, one or more machine learning algorithms 212, trained to adjust a provider object generated according to a first standard type to includes estimates of information provided by the provider system 102 when the provider system 102 generates provider objects according to a second standard type.

While the one or more programmatic algorithms 210 and the one or more machine learning algorithms 212 are depicted in FIG. 2 as being separate from the application 206, the one or more programmatic algorithms 210 and the one or more machine learning algorithms 212 may be integrated with the application 206 and/or the one or more programmatic algorithms 210 and the one or more machine learning algorithms 212 may comprise modules of the application 206.

However, it is understood that while as described herein, present examples may be implemented using the one or more programmatic algorithms 210 and the one or more machine learning algorithms 212, in other examples, one or more programmatic algorithms 210 may be used, or one or more machine learning algorithms 212 may be used (e.g., the one or more machine learning algorithms 212 may be optional or the one or more programmatic algorithms 210 may be optional).

Furthermore, while present examples are described with respect to the one or more programmatic algorithms 210 and the one or more machine learning algorithms 212 adjusting provider objects generated by one provider system 102, one or more programmatic algorithms 210 and/or one or more machine learning algorithms 212 may be provided to adjust provider objects generated by a plurality of provider system 102.

As will be described in more detail below, in some examples, the application 206 may comprise and/or have access to, different retrieval processes, such as a first retrieval algorithm 214 and a second retrieval algorithm 216, for retrieving provider objects generated according to a first standard type. For example, the different retrieval algorithms 214, 216 may represent different algorithms for searching published GDS-bases fares, schedules, and the like based on criteria received from the client device 104 (e.g., such as dates for a flight, originating and destination cities and/or airports, and the like). Such retrieval algorithms 214, 216 may use different respective types of search parameters and/or processes to search for provider objects according to a first standard type and/or such retrieval algorithms 214, 216 may search different respective databases that maintain different versions of the published GDS-bases fares, schedules, and the like.

For example, the first retrieval algorithm 214 may search databases of published GDS-bases fares, schedules, and the like that are maintained by the provider system 102. Furthermore the first retrieval algorithm 214 may have access to rules, and the like, of the provider system 102 as to which flights and/or fares, and the like, may be preferred by the provider system 102 (e.g., some flights may be considered better than others as decided by the provider system 102).

In contrast, the second retrieval algorithm 216 may search databases of published GDS-bases fares, schedules, and the like that may be maintained by the provider system 102, or another entity (e.g., a third party entity that retrieves the GDS-bases fares, schedules from the provider system 102 and published them). Furthermore the second retrieval algorithm 216 may not have access to the aforementioned rules, and the like, of the provider system 102.

However, such differences between the retrieval algorithms 214, 216 are understood to be examples only and any suitable differences may occur between the retrieval algorithms 214, 216 that may lead to different search results based on same criteria received from the client device 104.

While the retrieval algorithms, 214, 216 are depicted in FIG. 2 as being separate from the application 206, the algorithms, 214, 216 may be integrated with the application 206 and/or the retrieval algorithms, 214, 216 may comprise modules of the application 206. Furthermore, while present examples are described with respect to two retrieval algorithms, 214, 216, the memory 204 may store more than two retrieval algorithms.

However, it is understood that while as described herein, present examples may be implemented using two retrieval algorithms 214, 216, in other examples, one retrieval algorithm may be used.

While structure of the provider system 102 and the client device 104 is not described in detail, the provider system 102 and the client device 104 are understood to have a similar structure as the intermediation server 108, but adapted for the functionality of the provider system 102 and the client device 104.

Attention is next directed to FIG. 3 which depicts a block diagram of an example of the computing-process flow 110. While the example computing-process flow 110 is depicted in the form of a flow chart, it is understood that the example computing-process flow 110 (e.g., hereafter the computing-process flow 110) may shows steps of an API that include steps 302-1, 302-2, 302-3, 302-4 are hereafter interchangeably referred to, collectively, as the steps 302 and, generically, as a step 302. This convention will be used throughout the present specification.

For example, at the requesting step 302-1, a user of the client device 104 may enter criteria and/or details at data fields of a GUI (Graphic User Interface) used for searching for provider objects representing flights, such as a date (e.g., and time) for a flight, a departure airport, an arrival airport, among other possibilities; the criteria may be provided to the intermediation server 108, and the intermediation server 108 may provide the criteria and/or details to the provider systems 102. The provider systems 102 may return respective offers (e.g., NDC offers) of provider objects representing flights that meet the criteria and/or details. In general, such offers of provider objects may be customized based on options associated with a provider system 102. The intermediation server 108 may aggregate offers of provider objects from a plurality of provider systems 102 and return the offers of provider objects to the client device 104. In NDC-based data exchanges, it is understood that the offers may be identified by respective offer identifiers (e.g., which may be referred to as OfferIds and/or an OfferID). However, in other examples, rather than return NDC offers, a provider system 102 may return Edifact recommendations (e.g., in a GDS-based data exchange). Nonetheless, hereafter, the steps 302 will be described with reference to offers and/or NDC offers, though it is understood that, at the requesting step 302-1, any suitable combination of NDC offers and Edifact recommendations may be received from the provider systems 102 and returned to the client device 104 (e.g., including, but not limited to, NDC offers only or Edifact recommendations only).

At the selecting step 302-2, a list of offers (and the like) of the provider objects representing the flights returned by the provider systems 102, via the intermediation server 108, may be provided in a GUI at a display screen associated with the client device 104, and from which a user of the client device 104 may select, for example, a flight to book; in some examples, the user of the client device 104 may select electronic buttons, and the like to add a service to an offer and/or a provider object, such as a pickup service. At the selecting step 302-2, the client device 104 may request a "firm" offer for the selected provider object, such as a "firm" and/or finalized price, which may be different from a "published" price. Any suitable exchanges of data via the network 106 between the client device 104, the intermediation server 108, and the provider system 102 are understood to occur to select, request and receive the firm offer of the provider object, however such data exchanges are understood to be based on the aforementioned offer identifiers when such data exchanges comprise NDC-based data exchanges (e.g., using an offer identifier of a selected offer).

Similarly, at the booking step 302-3, information for a selected provider object, such as the aforementioned flight, may be provided in a GUI at a display screen, and from which a user of the client device 104 may select electronic buttons to pay for the flight, and/or to add a service to a booking, such as a pickup service, and the like. Any suitable exchanges of data via the network 106 between the client device 104, the intermediation server 108, and the provider system 102 are understood to occur to book the firm offer of the provider object however such data exchanges are understood to be based on the aforementioned offer identifiers when such data exchanges comprise NDC-based data exchanges.

Similarly, at the paying step 302-4, fields for entering payment information, such as credit card information, to pay for a selected flight being booked may be provided in a GUI at a display screen. Any suitable exchanges of data via the network 106 between the client device 104, the intermediation server 108, and the provider system 102 are understood to occur to pay for the firm offer of the provider object.

While the steps 302 may all be implemented to purchase a provider object (e.g., a flight represented by a provide object), the requesting step 302-1 may be implemented many tens to hundreds to thousands of times (or higher) for instances of the remaining steps 302. For example, users of a client device 104 may request and review many provider objects before selecting and/or booking and/or paying for a provider object; indeed, users of a client device 104 may request and review many provider objects and never select and/or book and/or pay for a provider object. Furthermore, users of different client devices 104 may request provider objects at respective requesting steps 302-1 using similar and/or the same criteria, which may result in the provider system 102 providing similar and/or same provider objects to the client devices 104 (e.g., presuming the client devices 104 and/or requests received at a requesting step 302-2 meet same or similar options and/or factors associated with a provider system 102 providing the provider objects).

Figure 4:
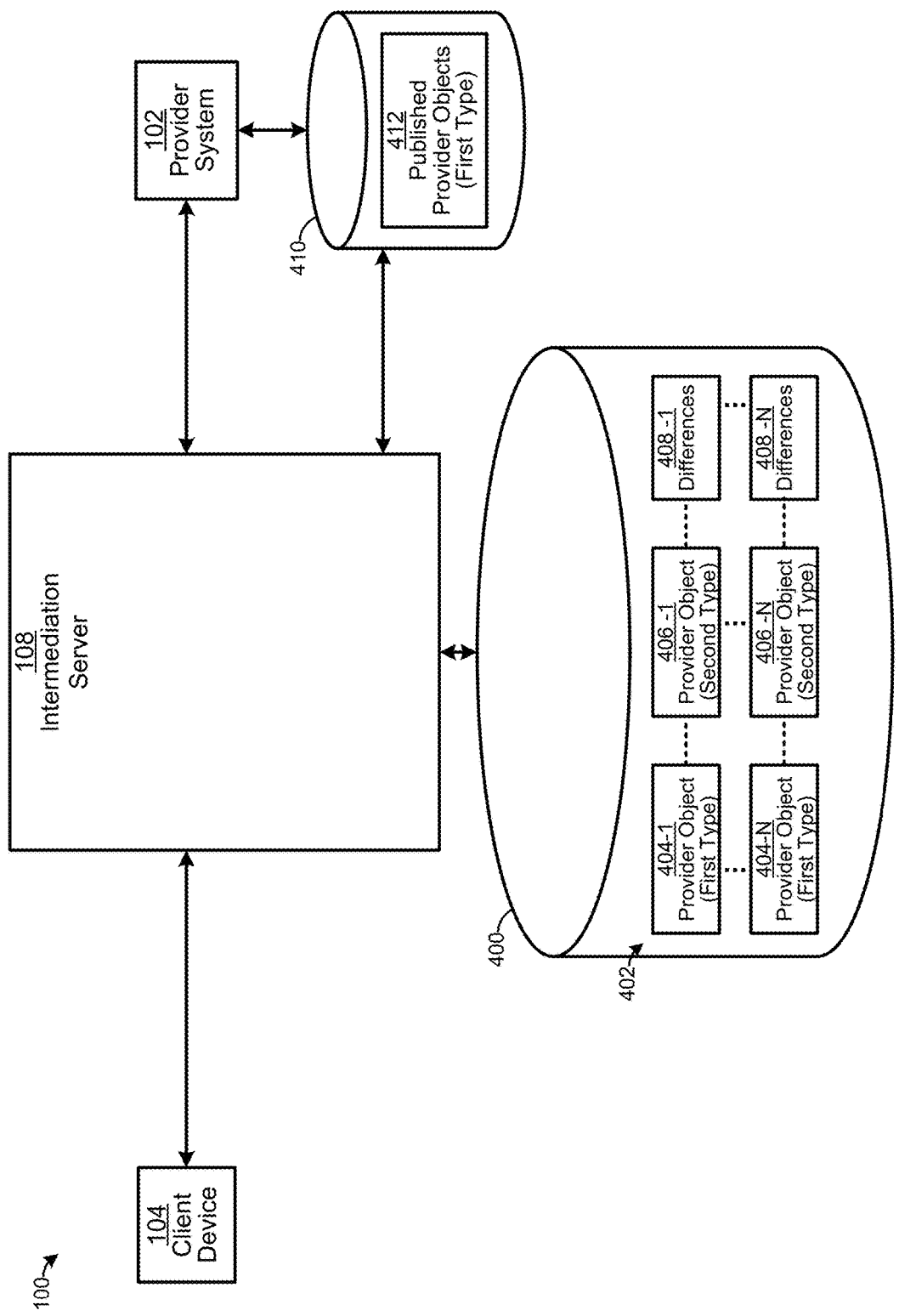
FIG. 4 depicts the system of FIG. 1 in further detail, according to non-limiting examples.

Attention is now directed to FIG. 4 which aspects of one example of the system 100 that includes one provider system 102, one client device 104 and the intermediation server 108 intermediating therebetween. While the network 106 is not depicted, it is nonetheless understood to be present. For example, communication links between components of the system 100 are depicted in FIG. 4, and throughout the present specification, as double-ended arrows between respective components; the communication links may include any suitable combination of wireless and/or wired links and/or wireless and/or wired communication networks including, but not limited to, the network 106.

Also depicted in FIG. 4 is a memory 400 to which the intermediation server 108 has access. The memory 400 may be separate from the intermediation server 108 and/or the intermediation server 108 may at least partially comprise the memory 400 (e.g., at least a portion of data stored at the memory 400 may be stored at the memory 204).

While depicted in the form of a database, the memory 400 may comprise one or more suitable memories 400 at which provider objects (e.g., in form of offers for provider objects, and/or in any other suitable format, may be stored. The memory 400, which may be referred to hereafter interchangeably as one or more memories 400, may be separate from the intermediation server 108 and/or at least partially integrated with the intermediation server 108, for example at the memory 204.

As depicted, the memory 400 stores historical provider object data 402, which, as depicted, includes an "N" number of provider objects 404-1 . . . 404-N generated according to a first standard type, an "N" number of corresponding provider objects 406-1 . . . 406-N generated according to a second standard type, and, optionally, respective differences 408-1 . . . 408-N between the provider objects 404-1 . . . 404-N and the corresponding provider objects 406-1 . . . 406-N.

For simplicity, the provider objects 404-1 . . . 404-N will be interchangeably referred to hereafter, collectively, as the provider objects 404 and, generically, as a provider object 404. This convention will be used elsewhere in the present specification. For example, the corresponding provider objects 406-1 . . . 406-N will be interchangeably referred to as the provider objects 406 and/or a provider object 406, and the respective differences 408-1 . . . 408-N will be interchangeably referred to as the differences 408 and/or differences 408.

Furthermore, associations between the provider objects 404, the corresponding provider objects 406, and the respective differences 408 are indicated in FIG. 4 by dashed lines therebetween. For example, the provider objects 404-1, the provider objects 406-1, and the respective differences 408-1 are understood to be associated with each other.

While the respective differences 408 may be optional, it is understood that pairs of provider objects 404 and associated corresponding provider objects 406 represent such differences 408.

Furthermore, in some examples one or more subsets of the provider objects 404 may be the same or similar to each other, and one or more respective subsets of the provider objects 406 may be the same or similar to each other. Furthermore, when two provider objects 404 are the same or similar, one of the two provider objects 404 and a corresponding provider object 406 may be similar such that a corresponding difference 408 is relatively small, while another of the two provider objects 404 and a respective corresponding provider object 406 may not similar such that a respective corresponding difference 408 is relatively large.

Furthermore, a number "N" of the provider objects 404, 406 (e.g., and the respective differences 408) may be any suitable number, and may be on the order of thousands, millions, hundreds of millions, and the like. Indeed, the number "N" of the provider objects 404, 406 (e.g., and the respective differences 408) may change over time, and the intermediation server 108 may maintain only provider objects 404, 406 (e.g., and the respective differences 408) for a given period of time, such as one week, with the provider objects 404, 406 (e.g., and the respective differences 408) older than one week being discarded. However, any suitable number of provider objects 404, 406 (e.g., and the respective differences 408), stored for any suitable period of time, is within the scope of the present specification.

In general, it is understood that the intermediation server 108 may maintain the historical provider object data 402, and that the provider objects 404 comprise provider objects generated by a provider system 102 (e.g., any suitable provider system 102) according to a first standard type, such as GDS-based data exchanges, and the provider objects 406 comprise provider objects generated by a provider system 102 (e.g., any suitable provider system 102) according to a second standard type, such as NDC-based data exchanges.

In particular, a provider object 404 may comprise an Edifact and/or GDS-based recommendation for a given flight, generated by the provider system 102, and a corresponding provider object 406 may comprise an NDC-based offer for the same given flight, generated by the provider system 102.

For example, in a previous implementation of the computer process flow 110, the client device 104 may have requested information on flights from the intermediation server 108, and a particular provider object 404 based on a GDS-based data exchange may have been provided to the client device 104 by the intermediation server 108 at the requesting step 302-2 (e.g., as generated by the provider system 102). At the previous implementation of the computer process flow 110, the client device 104 may have selected the particular provider object 404 to book (e.g., at the selecting step 302-2 and/or the booking step 302-3), and a corresponding provider object 406, based on an NDC-data exchange may have been provided to the client device 104 by the intermediation server 108 (e.g., as generated by the provider system 102). In this example, the intermediation server 108 may have stored both the particular provider object 404 and the corresponding provider object 406, both generated by the provider system 102, at the memory 400 for use in later adjusting provider objects, generated according to GDS-based data exchanges, to include estimates of information provided by the provider system 102 when the provider system generates the provider objects according to NDC based-data exchanges.

Furthermore, while as depicted the intermediation server 108 may further determine respective differences 408 between the provider objects 404, 406 (e.g., such as price differences, service differences, and the like), determining and storing the respective differences 408 may be optional.

The historical provider object data 402 may be used to train one or more of the machine learning algorithms 212, for example in a training mode. In particular, the provider objects 404 may be used as training input to the one or more of the machine learning algorithms 212 in the training mode, and the corresponding provider objects 406 and/or the respective differences 408 may be used as training output to the one or more of the machine learning algorithms 212 in the training mode. As such, the one or more of the machine learning algorithms 212 in the training mode may be trained to generate and/or output corresponding provider objects and/or respective differences when provider objects generated by the provider system 102 according to a GDS-based data exchange are used as input to the one or more of the machine learning algorithms 212. In particular, corresponding provider objects and/or respective differences generated by the one or more of the machine learning algorithms 212 may correspond to adjusted provider objects that include includes estimates of information provided by the provider system 102 when the provider system 102 generates provider objects according to the NDC-based data exchange.

It is further understood that training of the one or more of the machine learning algorithms 212 may occur periodically, and the like, as newer provider objects 404, 406 are added to the historical provider object data 402 (e.g., and/or as older provider objects 404, 406 are removed from the historical provider object data 402).

Furthermore, such training may include, but is not limited to, applying principles of generative modeling to the training. For example, in a specific example, the one or more of the machine learning algorithms 212 may include a neural network that trained to generate an NDC-based data-exchange result, such an NDC offer, from GDS-based data-exchange input, such as an Edifact recommendation. Put another way, the provider objects 404 used as training input may comprise Edifact recommendations, and the like, and the corresponding provider objects 406 used as training output may comprise NDC offers, and the like.

In some of these examples, one or more of the provider objects 404 and the corresponding provider objects 406 may be vectorized (e.g., placed into a neutral format with identifiers of an origin provider system 102 removed) prior to respective use as training input and training output.

Furthermore, in some of these examples, a discriminator model (e.g., a component of the one or more machine learning algorithms 212) may be trained to classify an origin of a provider object 404, 406 from a provider object 404, 406 itself, for example without knowledge of which provider system 102 provided a provider object 404, 406. Such training may occur by providing sets of provider objects 404, 406 as training data, as well as indicators indicating in which format a provider object 404, 406 is in. As such, the discriminator model will generally "learn" characteristics of each format so that the discriminator model can later identify a provider object 404, 406 as being one format or another format (e.g., identify a provider object 404, 406 as being of one standard type or another standard type).

Furthermore, a generator model (e.g., a component of the one or more machine learning algorithms 212) may be trained to adjust (e.g., transform) provider objects from one standard type to another standard type. Such training may be performed done by the generator model "competing" against the discriminator model. For example, the generator model may attempt to adjust (e.g., transform) provider objects from the first standard type into the second standard type, and the discriminator model may classify the resulting provider objects as being in the first standard type or the second standard type. For example, the discriminator model may output a score, such as between 0 and 100, amongst other possibilities, that indicates whether a provider object output by the generator model is in the first standard type (e.g., a "0" score) or in the second standard type (e.g., a "100" score), or in between. Such a score may be provided as feedback to the generator model which will accordingly "learn" to better adjust provider objects in the first standard type into the second standard type.

Furthermore, such training may be specific to a given provider system 102 (e.g., a given neural network may be specific to a given provider system 102, and the one or more machine learning algorithms may comprise a plurality of neural network in a one-to-one relationship with a plurality of provider system 102, or any other suitable number).

Furthermore, such training may be specific to given provider objects 404, 406 for different dates and times, and/or different combinations of origin airports and destination airports, and/or any other suitable factors of the provider objects 404, 406. Put another way, the one or more machine learning algorithms 212 may be configured to perform the adjustment functionality as described herein with respect to dates and/or time of flights and/or different combinations of origin airports and destination airports, for example associated with provider objects used as input to the one or more machine learning algorithms 212.

It is yet further understood that the provider objects 404, 406 (e.g., and the respective differences 408) may be used to generate the programming instructions for the one or more programmatic algorithms 210 to provide the adjustment functionality as described herein. For example, the provider objects 404, 406 (e.g., and the respective differences 408) may be analyzed and programming instructions for the one or more programmatic algorithms 210 may be generated that receives a provider object generated according to a first standard type, and output a corresponding provider object that includes estimates of information provided by the provider system 102 when the provider system generates provider objects according to a second standard type. The one or more programmatic algorithms 210 may be updated periodically, and the like, as newer provider objects 404, 406 are added to the historical provider object data 402 (e.g., and/or as older provider objects 404, 406 are removed from the historical provider object data 402). The one or more programmatic algorithms 210 may perform similar functionality as described above with respect to the one or more machine learning algorithms 212.

Hence, it is understood that, while the historical provider object data 402 is described with respect to provider objects 404, 406 generated by the provider system 102, the historical provider object data 402 may include provider objects generated by other provider systems 102, and that the one or more programmatic algorithms and/or one or more of the machine learning algorithms 212 may include programmatic algorithms and/or machine learning algorithms particular to the provider systems 102.

As depicted in FIG. 4, the system 100 further includes a memory 410 that stores published provider objects 412 generated according to a first standard type, such as GDS-based data exchanges, by the provider system 102. As such, the provider system 102 is depicted as being in communication with the memory 410.

The memory 410 may be separate from the intermediation server 108 and/or the intermediation server 108 may at least partially comprise the memory 410 (e.g., at least a portion of data stored at the memory 410 may be stored at the memory 204).

Similarly, the memory 410 may be separate from the provider system 102 and/or the provider system 102 may at least partially comprise the memory.

Regardless, the intermediation server 108 is understood to have access to the memory 410 and/or the published provider objects 412. The intermediation server 108 may receive search criteria from the client device 104 and use one or more of the retrieval algorithms 214, 216 to search the published provider objects 412 using the search criteria, for example rather than request provider objects (e.g., generated according to a second standard type, such as NDC offers) that meet the search criteria from the provider system 102.

As will be next described, the intermediation server 108 adjusts a published provider object 412, retrieved from the memory 410, to include includes estimates of information provided by the provider system 102 had the provider system 102 generated a provider object that meets the search criteria, according to the second standard type, and provides the adjusted provider object back to the client device 104 in response to receiving the search criteria. Such a process may occur in conjunction with the requesting step 302-1; when the client device 104 later selects and attempts to book the provided adjusted provider object at the selecting step 302-2 and/or the booking step 302-3, the intermediation server 108 may then request a provider object from the provider system 102.

Figure 5:
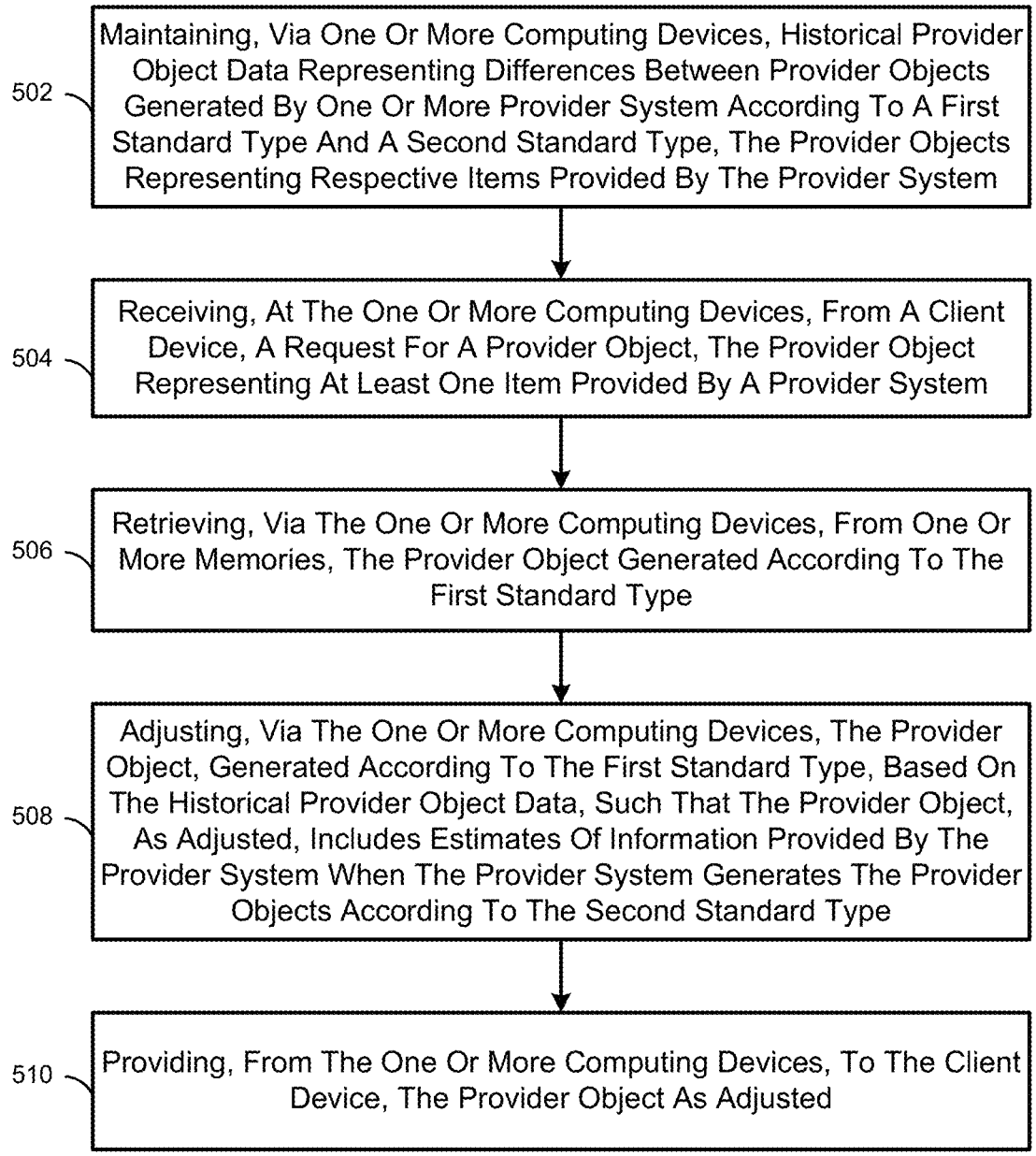
FIG. 5 depicts a flowchart of a method for reducing bandwidth usage by performing provider object adjustments at an intermediation server based on historical data, according to non-limiting examples.

Attention is now directed to FIG. 5 which depicts a flowchart representative of a method 500 a method for reducing bandwidth usage by performing provider object adjustments at an intermediation server based on historical data. The operations of the method 500 of FIG. 5 correspond to machine readable instructions that are executed by the intermediation server 108, and specifically the controller 202 of the intermediation server 108. In the illustrated example, the instructions represented by the blocks of FIG. 5 are stored at the memory 204 for example, as the application 206. The method 500 of FIG. 5 is one way in which the controller 202 and/or the intermediation server 108 and/or the system 100 may be configured. Furthermore, the following discussion of the method 500 of FIG. 5 will lead to a further understanding of the system 100, and its various components.

However, the method 500 is nonetheless further described with respect to implementation by one or more computing devices as functionality described with respect to the method 500 may be implemented by the intermediation server 108 and/or one or more cloud computing devices, one or more servers, and/or the like.

Similarly, the method 500 is nonetheless further described with respect to implementation using one or more memories, as data stored at the memories 204, 400, 410 may be stored at one of the memories 204, 400, 410, or two or more of the memories 204, 400, 410, and/or the memories 204, 400, 410 may be separate from one other, or at least partially integrated.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the system 100 of FIG. 1 and FIG. 5, as well.

It is understood that the method 500 may generally result in fewer requests for provider objects being provided to a provider system 102 at the requesting step 302-1, thereby reducing bandwidth usage of the system 100. Indeed, it is understood that the requesting step 302-1 may be replaced by aspects of the method 500.

At a block 502, the controller 202 and/or the intermediation server 108 and/or one or more computing devices, maintains historical provider object data 402 representing differences 408 between provider objects 404, 406 generated by one or more provider systems 102 according to a first standard type and a second standard type, the provider objects 404, 406 representing respective items provided by the one or more provider systems 102. The provider objects 404, 406 may be from any of the provider systems 102.

For example, the intermediation server 108 may maintain the historical provider object data 402 at the memory 400 as described above.

At a block 504, the controller 202 and/or the intermediation server 108 and/or one or more computing devices receives, from the client device 104 (e.g. via the communication interface 208), a request for a provider object 412, the provider object representing at least one item provided by a provider system 102 (e.g., the provider system 102 depicted in FIG. 4).

For example, the intermediation server 108 may receive a request from the client device 104 when the client device 104 is implementing the requesting step 302-1, the request including search criteria for a provider object that may correspond to criteria for flights on a given day between an origin airport and/or city, and a destination airport and/or city (e.g., and/or any other suitable search criteria including, but not limited to, criteria for searching for return flights).

At a block 506, the controller 202 and/or the intermediation server 108 and/or one or more computing devices retrieves, from one or more memories, such as the memory 410, the provider object 412 generated according to the first standard type.

For example, the intermediation server 108 may use one or more of the retrieval algorithms 214, 216 to search the memory 410 for published provider objects 412 that meet the search criteria received from the client device 104, and retrieve a provider object 412 that meets the search criteria. While retrieval of one provider object 412 is described hereafter, it is understood that more than one provider object 412 may be retrieved.

It is further understood that a retrieval algorithms 214, 216 may be selected by the controller 202 and/or the intermediation server 108 for use in retrieving the provider object 412 from the memory 410; such a selection is described in more detail below.

At a block 508, the controller 202 and/or the intermediation server 108 and/or one or more computing devices adjusts the provider object 412, generated according to the first standard type, based on the historical provider object data 402, such that the provider object 412, as adjusted, includes estimates of information provided by the provider system 102 when the provider system 102 generates the provider objects according to the second standard type.

For example, adjusting the provider object 412, generated according to the first standard type, based on the historical provider object data 402, such that the provider object 412, as adjusted, includes estimates of information provided by the provider system 102 when the provider system 102 generates the provider objects according to the second standard type, may include, but is not limited to:

Adjusting a price of the provider object 412. For example, the historical provider object data 402 may indicate that the provider objects 404, 406 have different prices (which may also be indicated in the respective differences 408). For example, a corresponding provider object 406 generated according to the second standard type may generally have a price that is a given percentage and/or a given amount, and the like, higher (or lower) than a provider object 404. Hence, the price of the provider object 412 may be adjusted based upon the given percentage and/or given amount.

Adjusting content of the provider object 412. For example, the historical provider object data 402 may indicate that the provider objects 404, 406 have different associated services (which may also be indicated in the respective differences 408). For example, continuing with travel-related examples, a corresponding provider object 406 generated according to the second standard type may generally include a checked bag, and the like, or any other suitable service, while a provider object 412 generated according to the first standard type may not specify a checked bag, or another suitable service. Hence, the content of the provider object 412 may be adjusted to include such services and/or content.

However, adjusting the provider object 412, at the block 506, may include any suitable adjustment indicated by differences 408 in the provider objects 404, 406 stored in the historical provider object data 402.

Furthermore, such differences 408 may furthermore be particular to provider objects 404, 406 that also meet the search criteria provided by the client device 104. For example, the controller 202 and/or the intermediation server 108 and/or one or more computing devices (e.g., and/or the one or more programmatic algorithms 210 and/or the one or more machine learning algorithms 212) may be more specifically configured to adjust the provider object 412 based on the provider objects 404, 406 that also meet the search criteria received from the client device 104.

It is further understood that the one or more programmatic algorithms 210 or the one or more machine learning algorithms may be selected by the controller 202 and/or the intermediation server 108 and/or the one or more computing devices may be selected to perform the adjustment; such a selection is described in more detail below.

At a block 510, the controller 202 and/or the intermediation server 108 and/or one or more computing devices provides, to the client device 104 (e.g. via the communication interface 208), the provider object 412, as adjusted.

In particular, the controller 202 and/or the intermediation server 108 and/or one or more computing devices may return the provider object 412, as adjusted, in response to the request received at the block 504.

Thereafter, the client device 104 may implement the selecting step 302-2 which may cause the client device 104 to request, from the intermediation server 108, a finalized price, and the like, for the provider object 412. The intermediation server 108 receives the request for the finalized price, and the like, and requests a finalized provider object that corresponds to the provider object 412, as adjusted, from the provider system 102. The request for the finalized provider object may include criteria specific to the provider object 412, as adjusted, such as a specific flight number, a date and time, origin and destination airports, and the like (e.g., and such criteria may be received from the client device 104 when implementing the selecting step 302-2).

The provider system 102 may then provide a corresponding provider object to the intermediation server 108, which returns the corresponding provider object to the client device 104 for use in the booking step 302-3 and/or the paying step 302-4.

It is further understood that the controller 202 and/or the intermediation server 108 and/or one or more computing devices may store the provider object 412 retrieved from the memory 410 at the block 506 at the memory 400 in association with the corresponding provider object received from the provider system 102, for example, respectively, as a new provider object 404 and a new corresponding provider object 406, to update the historical provider object data 402. In these examples, the controller 202 and/or the intermediation server 108 and/or one or more computing devices may further determine, and store, at the historical provider object data 402, respective differences 408 between the new provider object 404 and the new corresponding provider object 406.

The method 500 may include other features.

For example, returning to the block 508, adjusting the provider object 412, generated according to the first standard type, may occur according to a programmatic adjustment process or a machine learning adjustment process, for example by respectively implementing the one or more programmatic algorithms 210 and/or the one or more machine learning algorithms 212, as described herein. In these examples, the method 500 may further comprise:

> Maintaining records of respective differences between previous provider objects, as adjusted by the programmatic adjustment process and the machine learning adjustment process, to respective previous provider objects of the second standard type as generated by the provider system 102; and
>
> Selecting the programmatic adjustment process or the machine learning adjustment process to adjust the provider object 412 (e.g., at the block 508) based on which of the programmatic adjustment process or the machine learning adjustment process resulted in smallest of the differences relative to the respective previous provider objects of the second standard type as generated by the provider system 102.

For example, the method 500 may have been previously used to adjust a previous provider object 412 to include estimates of information provided by the provider system 102 when the provider system generates provider objects according to the second standard type (e.g., at the block 508) using the programmatic adjustment process and/or the machine learning adjustment process. Such a previous provider object 412 may have been provided to the client device 104 (e.g., at the block 510) and the client device 104 may have selected the previous provider object 412 to book (e.g., at the selecting step 302-2 and/or the booking step 302-3), which caused the intermediation server 108 to request a provider object from the provider system 102 (e.g., at the selecting step 302-2 and/or the booking step 302-3) that corresponds to the previous provider object 412, as adjusted.

Indeed, in some examples, the controller 202 and/or the intermediation server 108 and/or one or more computing devices may have generated two adjusted versions of the previous provider object 412: a first previous provider object adjusted using the programmatic adjustment process and a second previous provider object adjusted using the machine learning adjustment process. The controller 202 and/or the intermediation server 108 and/or one or more computing devices may compare both versions of previous provider object 412, as adjusted according to the programmatic adjustment process and the machine learning adjustment process, with the provider object requested from, and generated by, the provider system 102, to determine respective differences therebetween.

Such differences may be stored as records of the differences between previous provider objects, as adjusted by the programmatic adjustment process and the machine learning adjustment process, to respective previous provider objects of the second standard type as generated by the provider system 102, for example at the memory 400 and/or another memory.

However, in other examples, controller 202 and/or the intermediation server 108 and/or one or more computing devices may have used the programmatic adjustment process and the machine learning adjustment process at different implementations of the method 500 and stored respective records of the differences between previous provider objects, as adjusted by the programmatic adjustment process or the machine learning adjustment process, to respective previous provider objects of the second standard type as generated by the provider system 102, for example at the memory 400 and/or another memory.

Regardless, when the method 500 is again implemented, the controller 202 and/or the intermediation server 108 and/or one or more computing devices may select the programmatic adjustment process or the machine learning adjustment process to adjust, at the block 508, the provider object 412 based on which of the programmatic adjustment process or the machine learning adjustment process resulted in smallest of the differences relative to the respective previous provider objects of the second standard type as generated by the provider system 102. Put another way, one of the programmatic adjustment process or the machine learning adjustment process may provide a more accurate adjustment at the block 508, and the controller 202 and/or the intermediation server 108 and/or one or more computing devices may select whichever of the programmatic adjustment process or the machine learning adjustment process historically provided the most accurate adjustment.

In yet further examples of the method 500, and again returning to the block 508, adjusting the provider object 412, generated according to the first standard type, may occur according to a programmatic adjustment process or a machine learning adjustment process, for example by respectively implementing the one or more programmatic algorithms 210 and/or the one or more machine learning algorithms 212, as described herein. In these examples, the method 500 may further comprise:

> Retrieving, from the provider system 102, a respective provider object, generated by the provider system 102 according to the second standard type, that corresponds to the provider object 412 retrieved from the one or more memories (e.g., at the block 506); and
>
> Updating one or more of the programmatic adjustment process and the machine learning adjustment process based on respective differences between the provider object 412, generated according to the first standard type and retrieved from the one or more memories (e.g., at the block 506), and the respective provider object, generated according to the second standard type.

Hence, in this example, the controller 202 and/or the intermediation server 108 and/or one or more computing devices may retrieve the provider object 412 at the block 506 and further retrieve a respective provider object of the second standard type from the provider system 102, for example as received in conjunction with the client device 104 implementing the selecting step 302-2 and/or the booking step 302-3. In a training mode, the provider object 412 retrieved at the block 506 may be used as training input to the one or more machine learning algorithms 212, and the respective provider object of the second standard type generated and retrieved from the provider system 102 may be used as training output, for example to continue to train the one or more machine learning algorithms 212.

It is further understood that the provider object 412, retrieved at the block 506, and the respective provider object of the second standard type, generated and retrieved from the provider system 102, may alternatively be used to update the one or more programmatic algorithms 210.

In yet further examples of the method 500, returning to the block 506, retrieving the provider object 412 generated according to the first standard type may occur according to a first retrieval process or a second retrieval process respectively corresponding to the first retrieval algorithm 214 and the second retrieval algorithm 216. In these examples, the method 500 may further comprise:

> Maintaining records of respective differences between previous provider objects, generated according to the first standard type, retrieved by the first retrieval process and the second retrieval process, and respective previous provider objects of the second standard type as generated by the provider system; and Selecting the first retrieval process or the second retrieval process to retrieve the provider object 412 (e.g., at the block 506), generated according to the first standard type, based on which of the first retrieval process and the second retrieval process resulted in smallest of the respective differences relative to the respective previous provider objects of the second standard type as generated by the provider system 102.

For example, the method 500 may have been previously used to retrieve respective provider objects 412 at the block 506 using the first retrieval process and the second retrieval process. At least one of such respective previous provider objects 412 may have been provided to the client device 104 (e.g., at the block 510) and the client device 104 may have selected the previous provider object 412 to book (e.g., at the selecting step 302-2 and/or the booking step 302-3), which caused the intermediation server 108 to request a provider object from the provider system 102 (e.g., at the selecting step 302-2 and/or the booking step 302-3) that corresponds to the previous provider object 412, as adjusted.

The controller 202 and/or the intermediation server 108 and/or one or more computing devices may compare both versions of previous provider objects 412 retrieved using the first retrieval process and the second retrieval process with the provider object requested from, and generated by, the provider system 102, to determine respective differences therebetween. Such differences may be stored as records of the differences between previous provider objects 412, of the first standard type, as retrieved, to respective previous provider objects of the second standard type as generated by the provider system 102, for example at the memory 400 and/or another memory.

Hence, when the method 500 is again implemented, the controller 202 and/or the intermediation server 108 and/or one or more computing devices may select which of the first retrieval process and the second retrieval process resulted in a previous provider object 412 of the first standard type that had a smallest respective difference relative to the respective previous provider object of the second standard type as generated by the provider system 102. Put another way, one of the first retrieval process and the second retrieval process may result in retrieval of a respective provider object 412 that has smaller differences with a corresponding provider object that is later generated by the provider system 102; hence, the first retrieval process or the second retrieval process that historically results in such smaller differences may be selected at the block 506.

In yet further examples of the method 500, and again returning to the block 508, adjusting the provider object 412 may, in some instances, comprise adjusting the provider object 412 to generate a plurality of provider objects such that the plurality of provider objects, as adjusted, includes respective estimates of information provided by the provider system 102 when the provider system 102 generates the plurality of provider objects according to the second standard type, the plurality of provider objects as adjusted including the provider object as adjusted (e.g., at the block 508). In these examples, the block 510 may comprise providing to the client device 104, the plurality of provider objects as adjusted.

For example, rather than adjusting the provider object 412 generated according to the first standard type, using one estimation of information provided by the provider system 102, at the block 508, the provider object 412 generated according to the first standard type may be adjusted using a plurality of estimations of information provided by the provider system 102 to generate a plurality of provider objects of the second standard type, which may be provided to the client device at the block 510.

Hence, rather than adjust the provider object 412 retrieved from the memory 410 one time, at the block 508, the controller 202 and/or the intermediation server 108 and/or one or more computing devices may adjust the provider object 412 retrieved from the memory 410 a plurality of times resulting in a plurality of provider objects that include respective estimates of information provided by the provider system 102 when the provider system 102 generates the plurality of provider objects according to the second standard type.

Again using a travel-related example, a plurality of "adjusted" provider objects may result from the block 508, for example all representing a ticket for a same flight (e.g., that meets criteria of the request received at the block 504) but according to different fare classes (e.g., economy, premium, first class) and/or including different respective services and/or different combinations of services (e.g., one or more of checked bags, lounge passes, and the like). The plurality of adjusted provider objects to the client device 104 may be provided to the client device 104 at the block 510.

However, in other examples, the adjusted provider object that results from the block 508 may be used to generate a plurality of additional provider objects according to the second standard type (e.g., rather than the provider object 412 retrieved from the memory 410 prior to the aforementioned adjusting). In these examples, the method 500 may include the controller 202 and/or the intermediation server 108 and/or one or more computing devices generating a plurality of additional provider objects according to the second standard type from the provider object 412 as adjusted, the plurality of additional provider objects including further estimates of further information provided by the provider system 102 when the provider system 102 generates the provider objects according to the second standard type, all of the plurality of additional provider objects and the provider object 412 as adjusted comprising common information. For example, all of the plurality of additional provider objects and the provider object 412 as adjusted may represent tickets for a given flight, for various fare types and/or combinations of services, and such common information may include information defining the flight, including, but not limited to, a flight number, a date and/or time, origin and destination airports, and the like). In such examples, the method 500 comprises (e.g., at the block 510) the controller 202 and/or the intermediation server 108 and/or one or more computing devices providing, to the client device 104, the plurality of additional provider objects and the provider object 412 as adjusted.

Indeed, as will be described below with respect to FIG. 8, FIG. 9, FIG. 10 and FIG. 11, the system 100 may be additionally, or alternatively, configured to: store provider objects according to a given standard type (e.g., such as the second standard type (e.g., NDC)) at the memory 410 as well as maintain historical provider object data representing differences between a single and/or initial provider object, generated by a provider system 102 according to the given standard type in response to previous requests, and one or more corresponding provider objects that represent at least one same product and/or item as the single and/or initial provider object (e.g. such as a same flight), but adjusted to include other products and/or items. For example, the single and/or initial provider object and the one or more corresponding provider objects share common information that represent a same product and/or item, such as a same flight, but the single and/or initial provider object and the plurality of provider objects have differences that represent other associated products and/or items, such as different fares for different fare classes and/or different services, and the like.

As such, in these examples, the method 500 may include: maintaining, via the controller 202 and/or the intermediation server 108 and/or one or more computing devices, additional historical provider object data representing respective differences between single provider objects generated by the provider system 102 according to a given standard type (e.g., NDC data-based exchanges, or any other suitable standard type, such as GDS data-based exchanges), and one or more corresponding provider objects, also generated by the provider system 102, that represent at least one same item as a respective single provider object, the one or more corresponding provider objects further representing other items; receiving, at the controller 202 and/or the intermediation server 108 and/or one or more computing devices, from the client device 104, a further request for a further provider object, the further provider object representing at least one item provided by the provider system 102; retrieving, via the controller 202 and/or the intermediation server 108 and/or one or more computing devices, from the one or more memories 410, the further provider object of the given standard type that meets further criteria of the further request, the further provider object representing a given item; adjusting, via the controller 202 and/or the intermediation server 108 and/or one or more computing devices, the further provider object, retrieved from the one or more memories 410, based on the additional historical provider object data, to generate one or more additional provider objects that include respective estimates of further information provided by the provider system 102 when the provider system 102 generates one or more corresponding additional provider objects according to the given standard type using the further criteria of the further request, the additional provider objects representing the given item of the further provider object, and one or more other items different from items of the further provider object; and providing, from the controller 202 and/or the intermediation server 108 and/or one or more computing devices, to the client device 104, the further provider object and the one or more additional provider objects.

Figure 6:
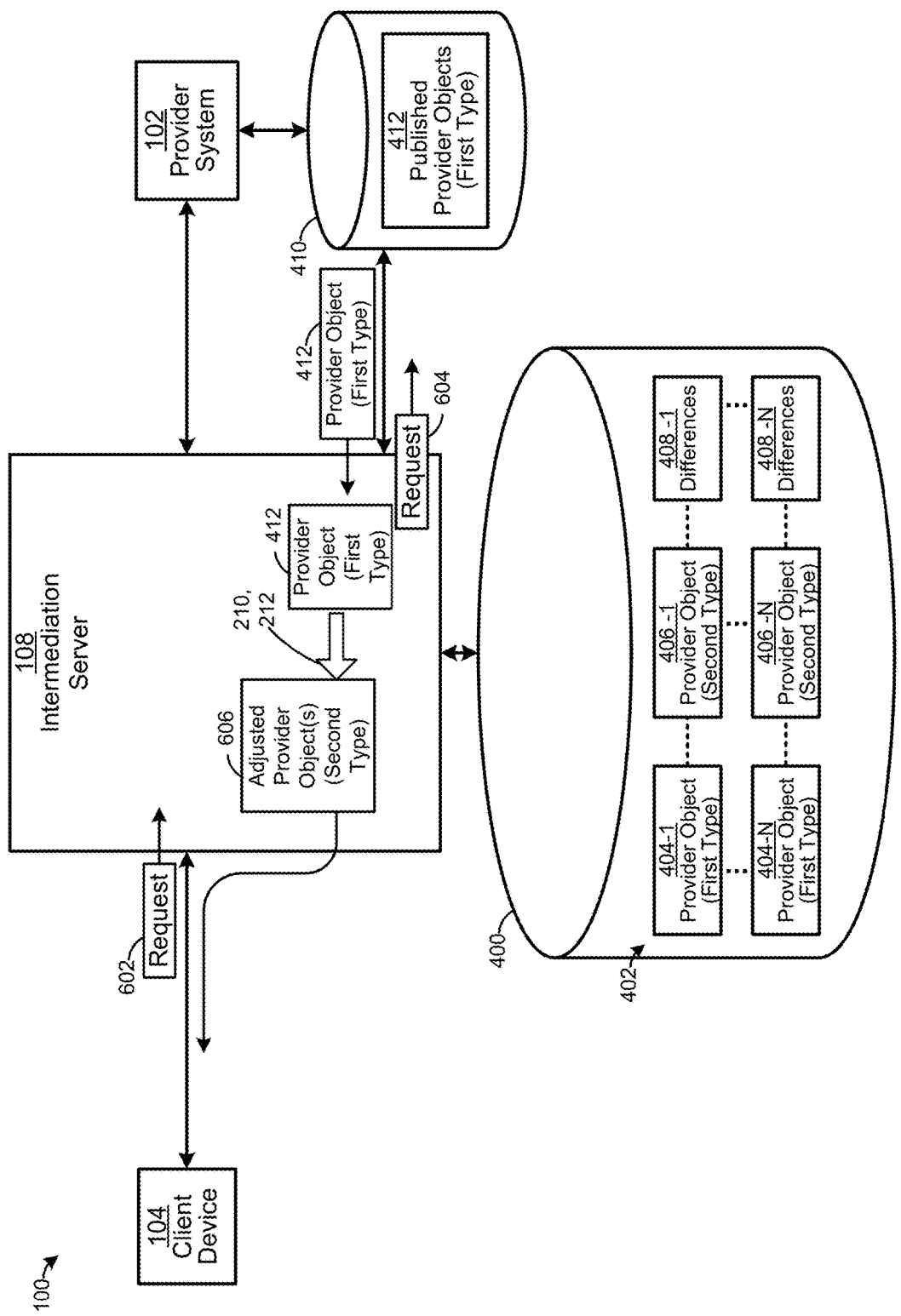
FIG. 6 depicts the system as depicted in FIG. 4 implementing aspects of a method for reducing bandwidth usage by performing provider object adjustments at an intermediation server based on historical data, according to non-limiting examples.
Figure 7:
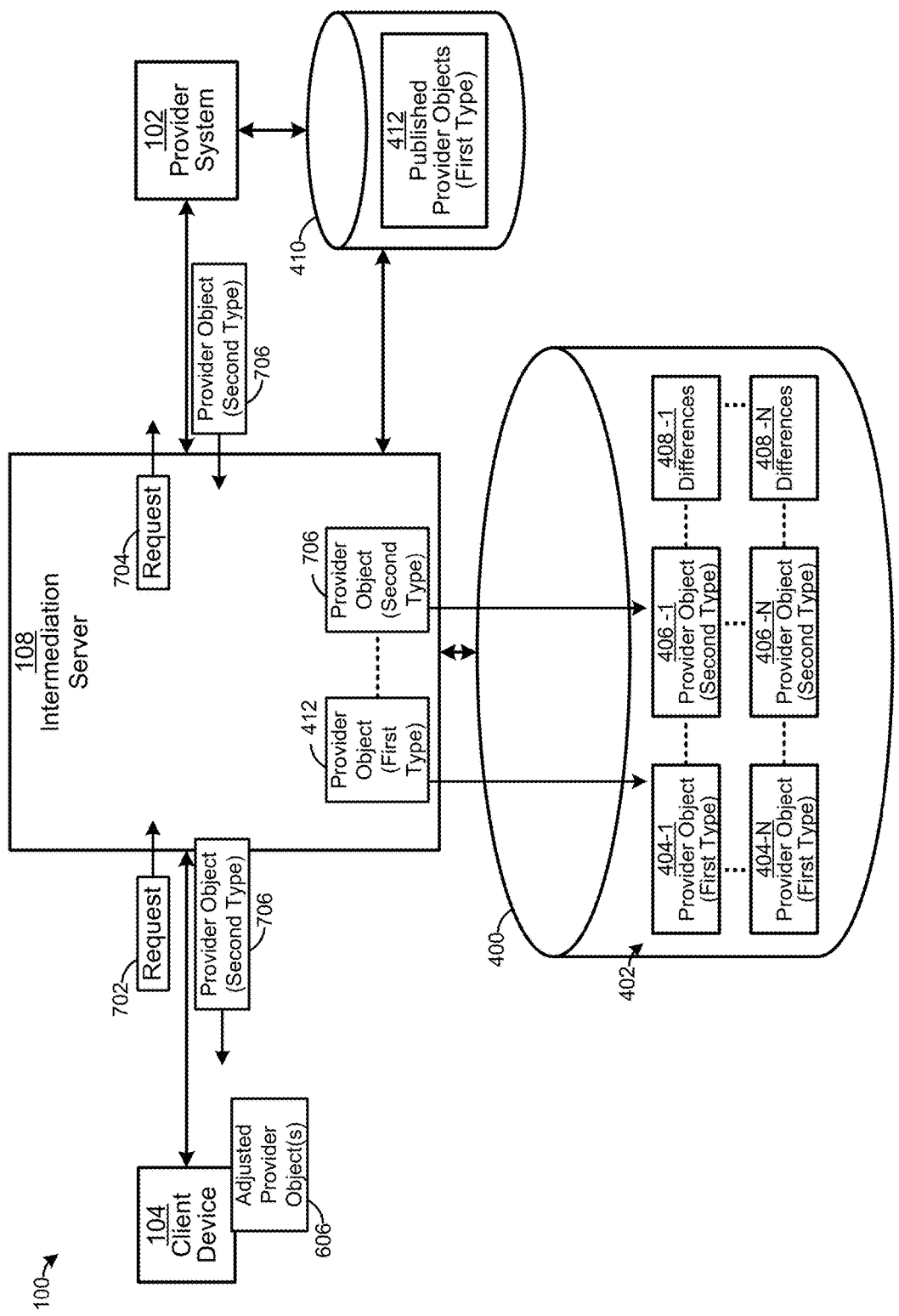
FIG. 7 depicts the system as depicted in FIG. 4 implementing further aspects of a method for reducing bandwidth usage by performing provider object adjustments at an intermediation server based on historical data, according to non-limiting examples.

Examples of aspects of the method 500 are now described with respect to FIG. 6 and FIG. 7, which are substantially similar to FIG. 4, with like components having like numbers.

With attention directed to FIG. 6, the client device 104 provides a request 602 to the intermediation server 108 for a provider object, for example at the shopping step 302-1. The request 602 is understood to include search criteria for searching for provider objects that correspond to flights, for example.

The intermediation server 108 receives (e.g., at the block 504 of the method 500) the request 602 and, rather than query the provider system 102 for provider objects, the intermediation server 108 provides a request 604 to the memory 410 and retrieves (e.g., at the block 506 of the method 500) a provider object 412 from the memory 410. Retrieval of the provider object 412 from the memory 410 is understood to occur using the first retrieval algorithm 214 and/or the second retrieval algorithm 216.

The provider object 412 is understood to comprise a provider object that meets the search criteria of the request 602, and the request 604 may further include the search criteria of the request 602. The provider object 412 is understood to have been generated according to a first standard type, such as the aforementioned GDS-based exchange format.

The intermediation server 108 adjusts (e.g., at the block 508 of the method 500) the provider object 412 retrieved from the memory 410, for example using the one or more programmatic algorithms 210 and/or the one or more machine learning algorithms 212 (e.g., corresponding to the programmatic adjustment process and/or the machine learning adjustment process) to generate an adjusted provider object 606 (and/or a plurality of adjusted provider objects 606), the adjusted provider object 606 comprising the provider object 412 retrieved from the memory 410 adjusted to include estimates of information provided by the provider system 102 had the provider system 102 generated the adjusted provider object 606 according to the second standard type, using, for example, the search criteria of the request 602 and/or the request 604. When a plurality of adjusted provider objects 606 are generated, the plurality of adjusted provider objects 606 comprises the provider object 412 retrieved from the memory 410 adjusted to include respective estimates of information provided by the provider system 102 had the provider system 102 generated the plurality of adjusted provider objects 606 according to the second standard type, using, for example, the search criteria of the request 602 and/or the request 604. Such a plurality of adjusted provider objects 606 may be for different fare types and/or include different combinations of one or more services.

Hence, the adjusted provider object 606 (and/or the plurality of adjusted provider objects 606) represents the provider object 412 adjusted to include (e.g., respective) estimates of information provided by the provider system 102 had the provider system 102 generated the adjusted provider object 606 (and/or the plurality of adjusted provider objects 606) according to the second standard type. For example, an adjusted provider object 606 may comprise an NDC offer and/or a provider object in an NDC data-based exchange format, and the like; however, in contrast to an NDC offer generated by the provider system 102, an adjusted provider object 606 may not include an offer identifier (e.g., such as an OfferIds and/or an OfferID). It is further understood that a price associated with an adjusted provider object 606 may be the same or different from a respective price associated with the provider object 412; for example, when the provider object 412 is in a GDS-based exchange format, and an adjusted provider object 606 may have a same associated price, or a price that is adjusted, for example to remove a GDS fee, and the like.

The intermediation server 108 provides (e.g., at the block 510 of the method 500) the adjusted provider object(s) 606 to the client device 104, for example in response to the request 602.

Attention is next directed to FIG. 7 which is understood to follow, in time, the example of FIG. 6. As depicted the adjusted provider object(s) 606 has (or have) been received at the client device 104, and the client device 104 provides a request 702 to select the adjusted provider object 606 (and/or one of the adjusted provider objects 606) for booking, for example at the selecting step 302-2. The request 702 is understood to identify information from the adjusted provider object 606 (and/or a selected adjusted provider object 606), such as a flight number and/or other information used to book a flight and/or any other suitable information that may be used to book and/or order an item represented by a provider object. The intermediation server 108 receives the request 702 and provides a corresponding request 704 to the provider system 102 which returns a corresponding provider object 706 according to the second standard type; however, in contrast to the adjusted provider object(s) 606, the corresponding provider object 706 represents a finalized price and/or finalized services and the like of an item represented by the corresponding provider object 706. The corresponding provider object 706 may further include an offer identifier (e.g., such as an OfferIds and/or an OfferID). The intermediation server 108 provides the corresponding provider object 706 to the client device 104 such that the client device may book and/or pay for the corresponding provider object 706.

In general, it is understood that an adjusted provider object 606 is an estimation of the corresponding provider object 706. Hence, any price and/or services represented by an adjusted provider object 606 is understood to be an estimation of a corresponding price and/or services represented by the corresponding provider object 706. However, the corresponding provider object 706 may still include a price and/or services different from a price and/or services of the adjusted provider object 606.

As depicted, the intermediation server 108 further stores the provider object 412 retrieved from the memory 410, and the corresponding provider object 706 received from the provider system 102, as, respectively, a new set of a provider object 404 and a corresponding provider object 406 at the historical provider object data 402, for example for use in updating the one or more programmatic algorithms 210 and/or the one or more machine learning algorithms 212 (e.g., the provider object 412 retrieved from the memory 410 may comprise a new provider object 404, and the corresponding provider object 706 received from the provider system 102 may comprise a corresponding provider object 406 stored in association with each other at the historical provider object data 402). Such storing is one example of the block 502 of the method 500.

Hence, the one or more programmatic algorithms 210 and/or the one or more machine learning algorithms 212 may be updated in a feedback loop. Such a feedback loop may comprise a machine learning feedback loop which may include checking a quality of an estimation of an adjusted provider object 606; for example, when the adjusted provider object 606 is generated by the one or more machine learning algorithms 212, the one or more machine learning algorithms 212, and the like, indicating the quality of the adjusted provider object 606, which can be used to determine whether or not to store the provider object 412 and the corresponding provider object 706 at the memory 400 (e.g., in the historical provider object data 402). For example, the score may be between 0 and 100, amongst other possibilities, with 0 representing poorest quality and 100 representing highest quality, and when the score is above a threshold score, such as 85, 90, or 95, amongst other possibilities, the provider object 412 and the corresponding provider object 706 may be stored at the memory 400, whereas when the score is below the threshold score, the provider object 412 and the corresponding provider object 706 may not be stored at the memory 400. In some examples, the score may be generated from feedback received from the client device 104, such as when an operator of the client device 104 is asked to provide such a score.

Furthermore, in instances where an adjusted provider object 606 has a score that is above the threshold score, a provider object 412 and a corresponding provider object 706 associated with the adjusted provider object 606 may be stored in the historical provider object data 402, along with differences 408 therebetween, as an example that may be used to further train the one or more machine learning algorithms 212.

However, in instances where an adjusted provider object 606 has a score that is below the threshold score, a provider object 412 and a corresponding provider object 706 associated with the adjusted provider object 606 may not be stored in the historical provider object data 402 and/or a provider object 412 and a corresponding provider object 706 associated with the adjusted provider object 606 may be stored in the historical provider object data 402 as negative training examples (e.g., examples that the one or more machine learning algorithms 212 are not to generate). Furthermore, when the score is below the threshold score (and/or below a second threshold score (e.g., 30, 40, 50, amongst other possibilities) less than the aforementioned threshold score), a retraining of the one or more machine learning algorithms 212 may occur using the provider objects 404, 406 stored at the memory 400. In some of these examples, such retraining of the one or more machine learning algorithms 212 may occur when a given number (e.g., 2, 3, 4, amongst other possibilities) of adjusted provider objects 606 are generated in a row that have a score that is below is below the threshold score (and/or below the second threshold score).

Figure 8:
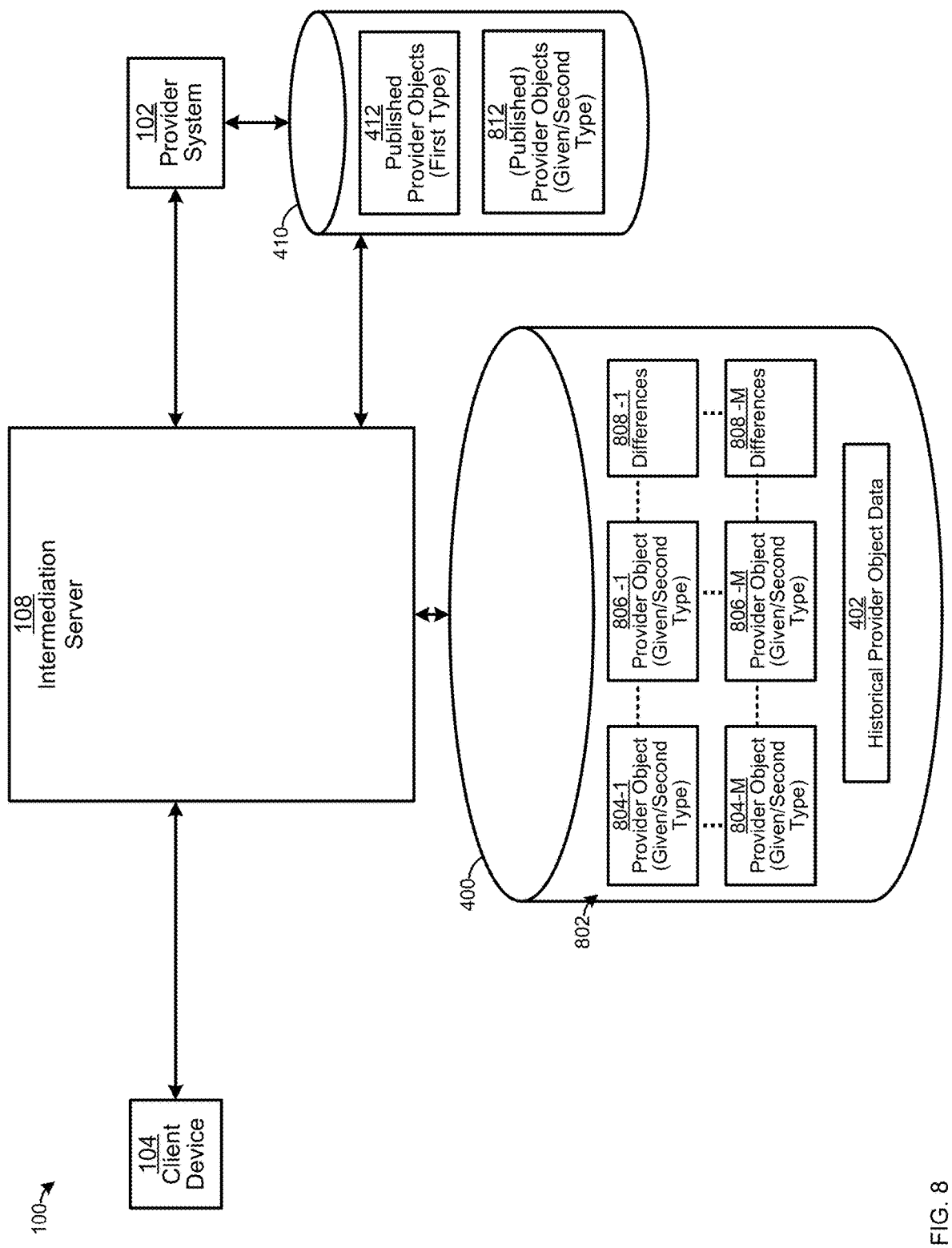
FIG. 8 depicts the system of FIG. 1 but with additional historical provider object data stored in a memory, according to non-limiting examples.

Attention is next directed to FIG. 8 which is substantially similar to FIG. 4, with like components having like numbers. However, in FIG. 8, the system 100 is adapted to include additional historical provider object data 802 stored at the memory 400, for example in addition to the historical provider object data 402; while details of the historical provider object data 402 are not depicted they are nonetheless understood to be present. Furthermore, while the historical provider object data 402 and the additional historical provider object data 802 are depicted as separate from each other, the historical provider object data 402 and the additional historical provider object data 802 may be combined.

The additional historical provider object data 802 includes historical provider object data 802, which, as depicted, includes an "M" number of provider objects 804-1 . . . 804-M (e.g., provider objects 804 and/or a provider object 804) generated according to given standard type (e.g., such as NDC-based data exchanges), and an "M" number of corresponding provider objects 806-1 . . . 806-M (e.g., corresponding provider objects 806 and/or a corresponding provider object 806) that share common information with a respective provider object 804.

Furthermore, a number "M" of the provider objects 804, 806 (e.g., and the respective differences 808) may be any suitable number, and may be on the order of thousands, millions, hundreds of millions, and the like. Indeed, the number "M" of the provider objects 804, 806 (e.g., and the respective differences 808) may change over time, and the intermediation server 108 may maintain only provider objects 804, 806 (e.g., and the respective differences 808) for a given period of time, such as one week, with the provider objects 804, 806 (e.g., and the respective differences 808) older than one week being discarded. However, any suitable number of provider objects 804, 806 (e.g., and the respective differences 808), stored for any suitable period of time, is within the scope of the present specification.

A given provider object 804 may represent single and/or initial provider object, generated by a provider system 102 according to the given standard type in response to a request from a client device 104, and a corresponding provider object 804 may represent at least one same product and/or item as the single and/or initial provider object, but adjusted to include other products and/or items, as previously described. Optionally, as depicted, the memory 400 may store respective differences 808-1 . . . 808-M (e.g., differences 808 and/or a difference 808) between the provider objects 804 and the corresponding provider objects 804.

Again using a travel-related example, a given provider object 804 may represent a ticket for a flight generated by a provider system 102 that meets criteria from a previous request from a client device 104, for example according to a given fare class that may (or may not) include additional services, for example a fare class and services that meet criteria of the request from the client device 104. A corresponding provider object 806 may represent a ticket for the same flight, also generated by the provider system 102, but of a different fare class and/or that includes other services; for example, in these examples, the provider system 102 may have previously provided the given provider object 804 in response to the request from the client device 104, and further provided the corresponding provider object 806 to the client device 104 to provide alternative fare classes and/or services for the flight (e.g., to provide a user of the client device 104 with options for the flight in addition to those that meet the request from the client device 104).

It is further understood that one or more of the provider objects 804 may be a same provider object 804, with different associated corresponding provider objects 806 representing different combinations of other products and/or services. Alternatively a given provider object 804 may be stored in association with more than one corresponding provider object 806 (and corresponding differences), for example as a provider system 102 may provide more than one alternative corresponding provider objects 806 in response to one request from a client device 104.

In addition, in FIG. 8, the memory 410 stores provider objects 812 in the same given format as the provider objects 804 that have been previously provided and/or published by the provider system 102.

Furthermore, while as depicted the intermediation server 108 may further determine respective differences 808 between the provider objects 804, 806 (e.g., such as price differences, service differences, and the like), determining and storing the respective differences 808 may be optional.

The additional historical provider object data 802 may be used to train one or more of the machine learning algorithms 212, for example in a training mode. In particular, the provider objects 804 may be used as training input to the one or more of the machine learning algorithms 212 in the training mode, and the corresponding provider objects 806 and/or the respective differences 808 may be used as training output to the one or more of the machine learning algorithms 212 in the training mode, for example to generate additional provider objects in a given format from a provider object 812 in the given format retrieved from the memory 410.

It is further understood that training of the one or more of the machine learning algorithms 212 may occur periodically, and the like, as newer provider objects 804, 806 are added to the additional historical provider object data 802 (e.g., and/or as older provider objects 804, 806 are removed from the additional historical provider object data 802).

Figure 9:
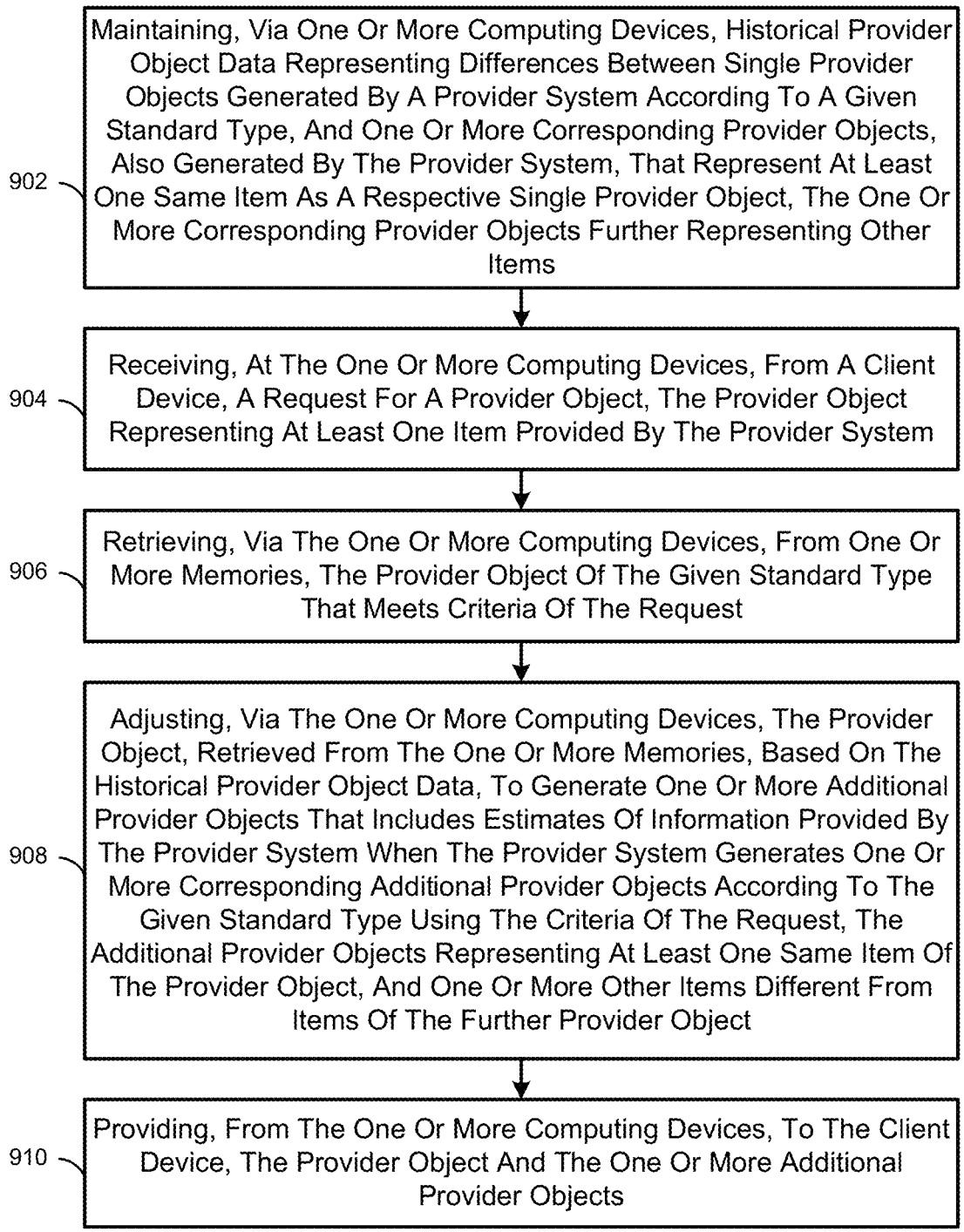
FIG. 9 depicts a flowchart of a method for reducing bandwidth usage by performing provider object adjustments at an intermediation server based on historical data (e.g. the additional historical provider object), according to non-limiting examples.

Attention is now directed to FIG. 9 which depicts a flowchart representative of a method 900 a method for reducing bandwidth usage by performing provider object adjustments at an intermediation server based on historical data. The operations of the method 900 of FIG. 9 correspond to machine readable instructions that are executed by the intermediation server 108, and specifically the controller 202 of the intermediation server 108. In the illustrated example, the instructions represented by the blocks of FIG. 9 are stored at the memory 204 for example, as the application 206 or another application (not depicted). The method 900 of FIG. 9 is one way in which the controller 202 and/or the intermediation server 108 and/or the system 100 may be configured. Furthermore, the following discussion of the method 900 of FIG. 9 will lead to a further understanding of the system 100, and its various components.

However, the method 900 is nonetheless further described with respect to implementation by one or more computing devices as functionality described with respect to the method 900 may be implemented by the intermediation server 108 and/or one or more cloud computing devices, one or more servers, and/or the like.

Similarly, the method 900 is nonetheless further described with respect to implementation using one or more memories, as data stored at the memories 204, 400, 410 may be stored at one of the memories 204, 400, 410, or two or more of the memories 204, 400, 410, and/or the memories 204, 400, 410 may be separate from one other, or at least partially integrated.

The method 900 of FIG. 9 need not be performed in the exact sequence as shown and likewise various blocks may be performed in parallel rather than in sequence. Accordingly, the elements of method 900 are referred to herein as "blocks" rather than "steps." The method 900 of FIG. 9 may be implemented on variations of the system 100 of FIG. 1 and FIG. 9, as well.

It is understood that the method 900 may generally result in fewer requests for provider objects being provided to a provider system 102 at the requesting step 302-1, thereby reducing bandwidth usage of the system 100. Indeed, it is understood that the requesting step 302-1 may be replaced by aspects of the method 900.

Furthermore, in general, the method 900 may provide functionality similar to the method 500, but using provider objects that are all in same given format, with details of the method 500 adjusted accordingly.

At a block 902, the controller 202 and/or the intermediation server 108 and/or one or more computing devices, maintains the historical provider object data 802 representing differences between single provider objects 804 generated by a provider system 102 according to a given standard type, and one or more corresponding provider objects 806 also generated by the provider system 102, that represent at least one same item as a respective single provider object 804, the one or more corresponding provider objects 806 further representing other items. The provider objects 804, 806 may be from any of the provider systems 102. The given standard type may comprise an NDC-based data exchange, a GDS data-based exchange, and/or any other suitable standard.

At a block 904, the controller 202 and/or the intermediation server 108 and/or one or more computing devices receives, from a client device 104, a request for a provider object, the provider object representing at least one item provided by the provider system 102.

At a block 906, the controller 202 and/or the intermediation server 108 and/or one or more computing devices retrieves, from one or more memories 410, a provider object 812 of the given standard type that meets criteria of the request.

At a block 908, the controller 202 and/or the intermediation server 108 and/or one or more computing devices adjusts the provider object retrieved from the one or more memories 410 (e.g., at the block 906), based on the historical provider object data 802, to generate one or more additional provider objects that includes estimates of information provided by the provider system 102 when the provider system 102 generates one or more corresponding additional provider objects according to the given standard type using the criteria of the request (e.g., of the block 904), the additional provider objects representing at least one same item as the provider object (e.g., retrieved at the block 906), the additional provider objects representing at least one same item as the provider object (e.g., retrieved at the block 906), and one or more other items different from items of the provider object.

At a block 910, the controller 202 and/or the intermediation server 108 and/or one or more computing devices provides, to the client device 104, the provider object and the one or more additional provider objects.

In some examples, the one or more programmatic algorithms 210 and/or the one or more machine learning algorithms 212 may be adapted to implement the method 900 and/or at least the block 910, with the aforementioned scores and feedback loops adapted accordingly. Similarly, the retrieval algorithms 214, 216 may be adapted to implement at least the block 906.

Figure 10:
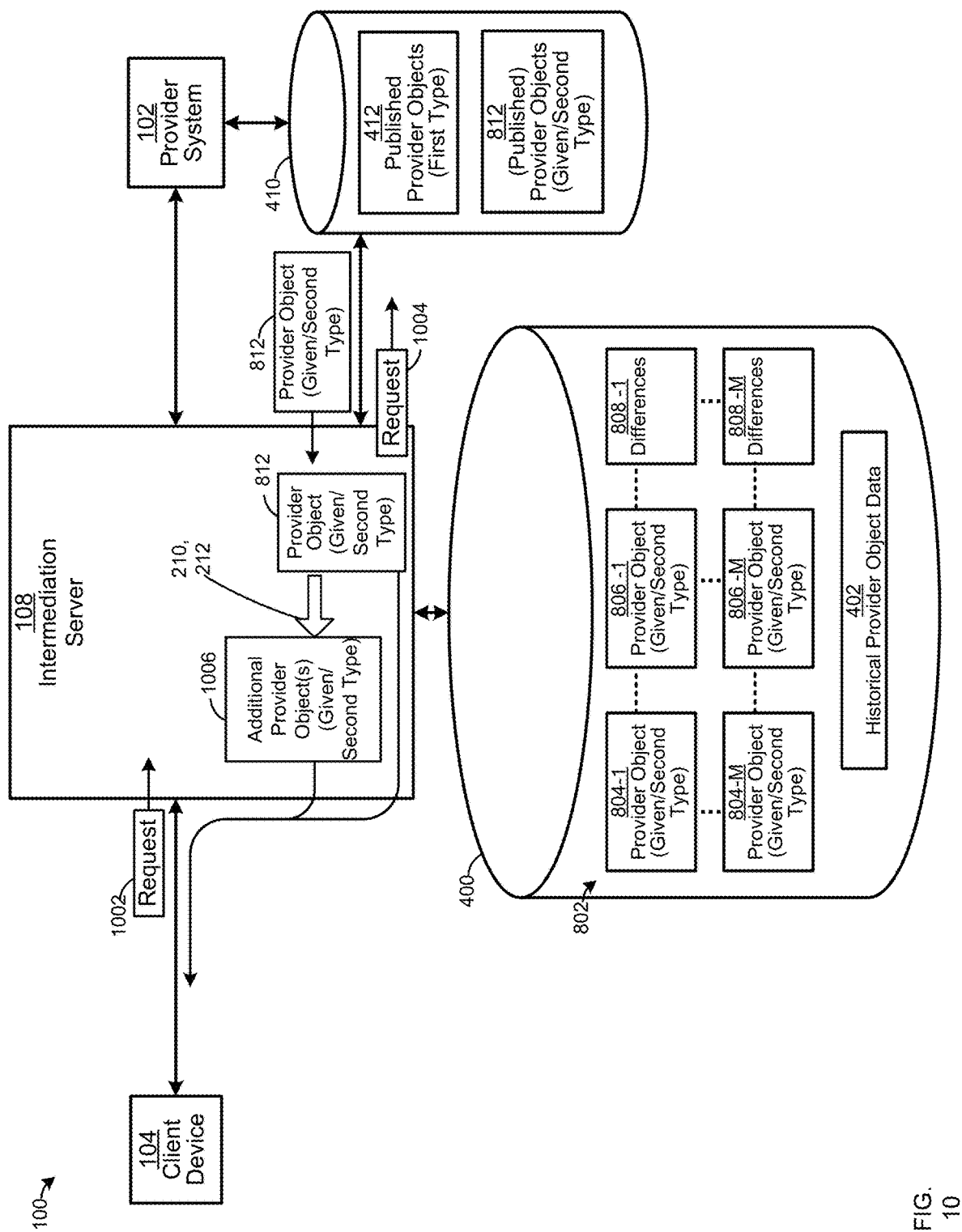
FIG. 10 depicts the system as depicted in FIG. 8 implementing aspects of a method for reducing bandwidth usage by performing provider object adjustments at an intermediation server based on the additional historical provider object, according to non-limiting examples.
Figure 11:
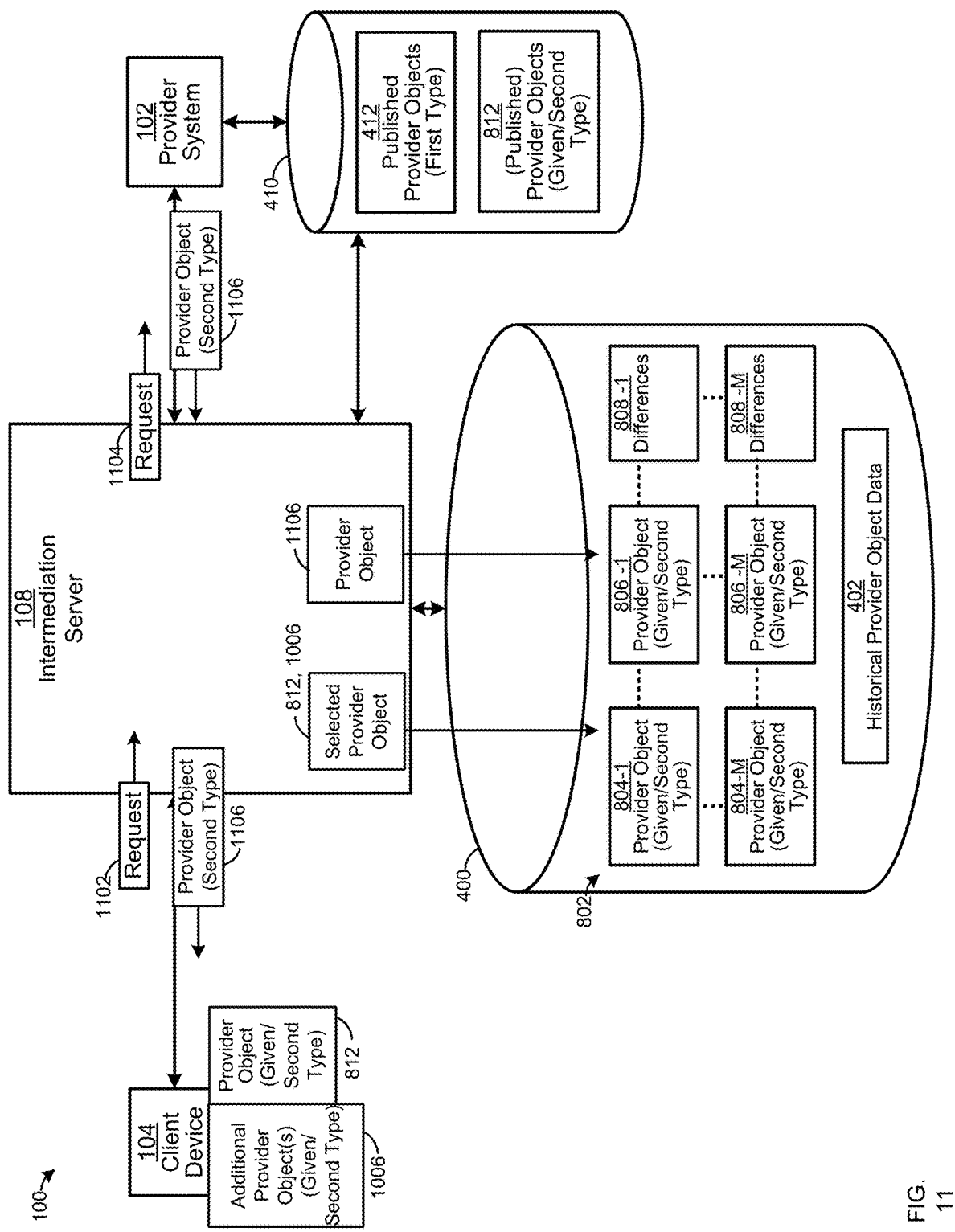
FIG. 11 depicts the system as depicted in FIG. 8 implementing further aspects of a method for reducing bandwidth usage by performing provider object adjustments at an intermediation server based on the additional historical provider object, according to non-limiting examples.

Examples of aspects of the method 900 are now described with respect to FIG. 10 and FIG. 11, which are substantially similar to FIG. 8, with like components having like numbers. Furthermore, the method 900 will be described with respect to the provider objects 804, 806, 812 being of a given standard type comprising the NDC-based data exchange format and the provider objects 412 being of a different standard type comprising the GDS-based data exchange format.

With attention directed to FIG. 10, the client device 104 provides a request 1002 to the intermediation server 108 for a provider object, for example at the shopping step 302-1. The request 1002 is understood to include search criteria for searching for provider objects that correspond to flights, for example.

The intermediation server 108 receives (e.g., at the block 904 of the method 900) the request 1002 and, rather than query the provider system 102 for provider objects, the intermediation server 108 provides a request 1004 to the memory 410 and retrieves (e.g., at the block 906 of the method 900) a provider object 812 from the memory 410. Retrieval of the provider object 812 from the memory 410 may occur using the first retrieval algorithm 214 and/or the second retrieval algorithm 216.

It is understood in these examples that the request 1002 may be provided according to the NDC-based data exchange format (e.g., the same given standard as the provider objects 812) and hence rather than retrieve a provider object 412 (e.g., that may be in the GDS-based data exchange format), the request 1004 may be for an NDC standard type provider object 812 is retrieved.

The provider object 812 is understood to comprise a provider object that meets the search criteria of the request 1002, and the request 1004 may further include the search criteria of the request 1002. The provider object 812 is understood to represent a given item, such as a flight and/or a ticket for the flight of a given fare class, and/or representing a combination of one or more services associated with the flight.

The intermediation server 108 adjusts (e.g., at the block 908 of the method 900) the provider object 812 retrieved from the memory 410, for example using the one or more programmatic algorithms 210 and/or the one or more machine learning algorithms 212 (e.g., corresponding to the programmatic adjustment process and/or the machine learning adjustment process) to generate one or more additional corresponding provider objects 1006. The one or more adjusted provider objects 1006 are understood to include estimates of information provided by the provider system 102 had the provider system 102 generated the adjusted provider object 1006, using, for example, the search criteria of the request 1002 and/or the request 1004.

However, in general, the one or more additional corresponding provider objects 1006 represent at least one same item of the provider object 812 retrieved from the memory 410, such as a same flight and one or more other respective items different from items of the provider object 812, such as a different fare (e.g., and/or a different fare class), and/or a combination of one or more services that are different from those represented by the provider object 812 retrieved from the memory 410.

The intermediation server 108 provides (e.g., at the block 910 of the method 900) the provider object 812 retrieved from the memory 410, and the one or more additional corresponding provider objects 1006 to the client device 104, for example in response to the request 1002.

Attention is next directed to FIG. 11 which is understood to follow, in time, the example of FIG. 10. As depicted the provider object 812 retrieved from the memory 410, and the one or more additional corresponding provider objects 1006 have been received at the client device 104, and the client device 104 provides a request 1102 to select the provider object 812 retrieved from the memory 410, or one the one or more additional corresponding provider objects 1006 for booking, for example at the selecting step 302-2. The request 1102 is understood to identify information from the selected provider object 812, 1006, such as a flight number and/or other information used to book a flight and/or any other suitable information that may be used to book and/or order an item represented by a provider object. The intermediation server 108 receives the request 1102 and provides a corresponding request 1104 to the provider system 102 which returns a corresponding provider object 1106 according to the given standard type; however, in contrast to the selected provider object 812, 1006, the corresponding provider object 1106 represents a finalized price and/or finalized services and the like of an item represented by the selected provider object 812, 1006. The corresponding provider object 1106 may further include an offer identifier (e.g., such as an OfferIds and/or an OfferID). The intermediation server 108 provides the corresponding provider object 1106 to the client device 104 such that the client device may book and/or pay for the corresponding provider object 1106.

In general, it is understood that the selected provider object 812, 1006 is an estimation of the corresponding provider object 1106. Hence, any price and/or services represented by the selected provider object 812, 1006 is understood to be an estimation of a corresponding price and/or services represented by the corresponding provider object 1106. However, the corresponding provider object 1106 may still include a price and/or services different from a price and/or services of the selected provider object 812, 1006.

As depicted, the intermediation server 108 further stores the selected provider object 812, 1006 retrieved from the memory 410, and the corresponding provider object 1106 received from the provider system 102, as, respectively, a new set of a provider object 804 and a corresponding provider object 806 at the additional historical provider object data 802, for example for use in updating the one or more programmatic algorithms 210 and/or the one or more machine learning algorithms 212 (e.g., the selected provider object 812, 1006 retrieved from the memory 410 may comprise a new provider object 804, and the corresponding provider object 1106 received from the provider system 102 may comprise a corresponding provider object 806 stored in association with each other at the additional historical provider object data 802). Such storing is one example of the block 902 of the method 900.

As should by now be apparent, the operations and functions of the devices described herein are sufficiently complex as to require their implementation on a computer system, and cannot be performed, as a practical matter, in the human mind. In particular, computing devices, and the lie, such as set forth herein are understood as requiring and providing speed and accuracy and complexity management that are not obtainable by human mental steps, in addition to the inherently digital nature of such operations (e.g., a human mind cannot interface directly with, RAM or other digital storage, cannot transmit or receive electronic messages, among other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:
maintaining, via one or more computing devices, historical provider object data representing differences between provider objects that represent same respective items generated by one or more provider systems according to a first standard type and a second standard type;
receiving, at the one or more computing devices, from a client device, a request for a provider object, the provider object representing at least one item provided by a provider system;
retrieving, via the one or more computing devices, from one or more memories, the provider object that represents the at least one item generated according to the first standard type;
adjusting, via the one or more computing devices, the provider object that represents the at least one item, generated according to the first standard type, based on the historical provider object data, such that the provider object, as adjusted, includes estimates of information provided by the provider system when the provider system generates a respective provider object, that represents a same at least one item, as the at least one item, according to the second standard type; and
providing, from the one or more computing devices, to the client device, the provider object as adjusted.

2. The method of claim 1, wherein adjusting the provider object, generated according to the first standard type, comprises one or more of:
adjusting a price of the provider object; and
adjusting content of the provider object.

3. The method of claim 1, wherein adjusting the provider object, generated according to the first standard type, occurs according to a programmatic adjustment process or a machine learning adjustment process, and the method further comprises:
maintaining records of respective differences between previous provider objects, as adjusted by the programmatic adjustment process and the machine learning adjustment process, to respective previous provider objects of the second standard type as generated by the provider system; and
selecting the programmatic adjustment process or the machine learning adjustment process to adjust the provider object based on which of the programmatic adjustment process or the machine learning adjustment process resulted in smallest of the respective differences relative to the respective previous provider objects of the second standard type as generated by the provider system.

4. The method of claim 1, wherein adjusting the provider object, generated according to the first standard type, occurs according to a programmatic adjustment process or a machine learning adjustment process, and the method further comprises:

retrieving, from the provider system, a further respective provider object, generated by the provider system according to the second standard type, that corresponds to the provider object retrieved from the one or more memories; and updating one or more of the programmatic adjustment process and the machine learning adjustment process based on respective differences between the provider object, generated according to the first standard type and retrieved from the one or more memories, and the further respective provider object, generated according to the second standard type.

5. The method of claim 1, wherein retrieving the provider object, generated according to the first standard type, occurs according to a first retrieval process or a second retrieval process, and the method further comprises:

maintaining records of respective differences between previous provider objects, generated according to the first standard type, retrieved by the first retrieval process and the second retrieval process, and respective previous provider objects of the second standard type as generated by the provider system; and selecting the first retrieval process or the second retrieval process to retrieve the provider object, generated according to the first standard type, based on which of the first retrieval process and the second retrieval process resulted in smallest of the respective differences relative to the respective previous provider objects of the second standard type as generated by the provider system.

6. The method of claim 1, wherein the adjusting the provider object, generated according to the first standard type, comprises:

adjusting the provider object to generate a plurality of provider objects, the plurality of provider objects, as adjusted, including respective estimates of information provided by the provider system when the provider system generates the plurality of provider objects according to the second standard type, the plurality of provider objects as adjusted including the provider object as adjusted, and wherein the providing, to the client device, the provider object as adjusted, comprises providing, to the client device, the plurality of provider objects as adjusted.

7. The method of claim 1, further comprising:

generating a plurality of additional provider objects, according to the second standard type, from the provider object as adjusted, the plurality of additional provider objects including further estimates of further information provided by the provider system when the provider system generates the provider objects according to the second standard type, all of the plurality of additional provider objects and the provider object as adjusted comprising common information;

and providing, to the client device, the plurality of additional provider objects.

8. The method of claim 1, further comprising:

maintaining, via the one or more computing devices, additional historical provider object data representing respective differences between single provider objects generated by the provider system according to a given standard type, and one or more corresponding provider objects, also generated by the provider system, that represent at least one same item as a respective single provider object, the one or more corresponding provider objects further representing other items;

receiving, at the one or more computing devices, from the client device, a further request for a further provider object, the further provider object representing at least one item provided by the provider system;

retrieving, via the one or more computing devices, from the one or more memories, the further provider object of the given standard type that meets further criteria of the further request, the further provider object representing a given item;

adjusting, via the one or more computing devices, the further provider object, retrieved from the one or more memories, based on the additional historical provider object data, to generate one or more additional provider objects that include respective estimates of further information provided by the provider system when the provider system generates one or more corresponding additional provider objects according to the given standard type using the further criteria of the further request, the additional provider objects representing the given item of the further provider object, and one or more other items different from items of the further provider object; and providing, from the one or more computing devices, to the client device, the further provider object and the one or more additional provider objects.

9. The method of claim 1, wherein the first standard type comprises a Global Distribution System (GDS)-based data exchange system, and the second standard type comprises New Distribution Capability (NDC)-based data exchange system.

10. A device comprising:
a communication interface; and
a controller configured to:
maintain historical provider object data representing differences between provider objects that represent same respective items generated by one or more provider systems according to a first standard type and a second standard type;

receive, via the communication interface, from a client device, a request for a provider object, the provider object representing at least one item provided by a provider system;

retrieve, from one or more memories, the provider object that represents the at least one item generated according to the first standard type;

adjust the provider object that represents the at least one item, generated according to the first standard type, based on the historical provider object data, such that the provider object, as adjusted, includes estimates of information provided by the provider system when the provider system generates a respective provider object, that represents a same at least one item, as the at least one item, according to the second standard type; and provide, via the communication interface, to the client device, the provider object as adjusted.

11. The device of claim 10, wherein the controller is further configured to adjust the provider object, generated according to the first standard type, by one or more of:
adjusting a price of the provider object; and
adjusting content of the provider object.

12. The device of claim 10, wherein the controller is further configured to adjust the provider object, generated according to the first standard type, according to a programmatic adjustment process or a machine learning adjustment process, and the controller is further configured to:

maintain records of respective differences between previous provider objects, as adjusted by the programmatic adjustment process and the machine learning adjustment process, to respective previous provider objects of the second standard type as generated by the provider system; and select the programmatic adjustment process or the machine learning adjustment process to adjust the provider object based on which of the programmatic adjustment process or the machine learning adjustment process resulted in smallest of the respective differences relative to the respective previous provider objects of the second standard type as generated by the provider system.

13. The device of claim 10, wherein the controller is further configured to adjust the provider object, generated according to the first standard type, according to a programmatic adjustment process or a machine learning adjustment process, and the controller is further configured to:

retrieve, from the provider system, a respective same provider object, generated by the provider system according to the second standard type, that corresponds to the provider object retrieved from the one or more memories; and update one or more of the programmatic adjustment process and the machine learning adjustment process based on respective differences between the provider object, generated according to the first standard type and retrieved from the one or more memories, and the respective same provider object, generated according to the second standard type.

14. The device of claim 10, wherein the controller is further configured to retrieve the provider object, generated according to the first standard type, according to a first retrieval process or a second retrieval process, and the controller is further configured to:

maintain records of respective differences between previous provider objects, generated according to the first standard type, retrieved by the first retrieval process and the second retrieval process, and respective previous provider objects of the second standard type as generated by the provider system; and select the first retrieval process or the second retrieval process to retrieve the provider object, generated according to the first standard type, based on which of the first retrieval process and the second retrieval process resulted in smallest of the respective differences relative to the respective previous provider objects of the second standard type as generated by the provider system.

15. The device of claim 10, wherein the controller is further configured to adjust the provider object, generated according to the first standard type, by:

adjusting the provider object to generate a plurality of provider objects, the plurality of provider objects, as adjusted, including respective estimates of information provided by the provider system when the provider system generates the plurality of provider objects according to the second standard type, the plurality of provider objects as adjusted including the provider object as adjusted, and wherein the providing, to the client device, the provider object as adjusted, comprises providing, to the client device, the plurality of provider objects as adjusted.

16. The device of claim 10, wherein the controller is further configured to:

generate a plurality of additional provider objects, according to the second standard type, from the provider object as adjusted, the plurality of additional provider objects including further estimates of further information provided by the provider system when the provider system generates the provider objects according to the second standard type, all of the plurality of additional provider objects and the provider object as adjusted comprising common information;

and provide, to the client device, the plurality of additional provider objects.

17. The device of claim 10, wherein the controller is further configured to:

maintain additional historical provider object data representing respective differences between single provider objects generated by the provider system according to a given standard type, and one or more corresponding provider objects, also generated by the provider system, that represent at least one same item as a respective single provider object, the one or more corresponding provider objects further representing other items;

receive, from the client device, a further request for a further provider object, the further provider object representing at least one item provided by the provider system;

retrieve, from the one or more memories, the further provider object of the given standard type that meets further criteria of the further request, the further provider object representing a given item;

adjust the further provider object, retrieved from the one or more memories, based on the additional historical provider object data, to generate one or more additional provider objects that include respective estimates of further information provided by the provider system when the provider system generates one or more corresponding additional provider objects according to the given standard type using the further criteria of the further request, the additional provider objects representing the given item of the further provider object, and one or more other items different from items of the further provider object; and provide, to the client device, the further provider object and the one or more additional provider objects.

18. The device of claim 10, wherein the first standard type comprises a Global Distribution System (GDS)-based data exchange system, and the second standard type comprises New Distribution Capability (NDC)-based data exchange system.

* * * * *